US010715896B2

(12) United States Patent
Kumakura et al.

(10) Patent No.: US 10,715,896 B2
(45) Date of Patent: Jul. 14, 2020

(54) SPEAKER AND SPEAKER MOUNTING STRUCTURE

(71) Applicant: JVC KENWOOD CORPORATION, Yokohama-shi, Kanagawa (JP)

(72) Inventors: Hiroyuki Kumakura, Yokohama (JP); Akira Shigeta, Yokohama (JP); Koji Yamazawa, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 16/184,330

(22) Filed: Nov. 8, 2018

(65) Prior Publication Data
US 2019/0082247 A1    Mar. 14, 2019

Related U.S. Application Data

(63) Continuation of application No. PCT/JP2017/030904, filed on Aug. 29, 2017.

(30) Foreign Application Priority Data

Sep. 8, 2016  (JP) .................................. 2016-175530
Sep. 23, 2016  (JP) .................................. 2016-185668

(51) Int. Cl.
*H04R 1/02*   (2006.01)
*F16B 5/02*   (2006.01)
*F16B 5/07*   (2006.01)
*F16B 21/09*  (2006.01)
(Continued)

(52) U.S. Cl.
CPC .............. *H04R 1/025* (2013.01); *F16B 5/02* (2013.01); *F16B 5/07* (2013.01); *F16B 5/10* (2013.01);
(Continued)

(58) Field of Classification Search
CPC .............. H04R 1/025; H04R 2201/021; H04R 2400/11; F16B 21/084; F16B 21/082; F16B 21/086; F16B 21/088; Y01T 24/309
See application file for complete search history.

(56) References Cited

U.S. PATENT DOCUMENTS 4,733,748 A * 3/1988 Ponticelli, Jr. ......... H04R 1/025
                                                    181/141
5,005,265 A *  4/1991 Muller .................... F16B 21/07
                                                     24/289
(Continued)

FOREIGN PATENT DOCUMENTS

JP      S57-104579 U1    6/1982
JP      S60-78104 A      5/1985
(Continued)

OTHER PUBLICATIONS

PCT/ISA/237 issued in corresponding International Application No. PCT/JP2017/030904.

*Primary Examiner* — Fan S Tsang
*Assistant Examiner* — Ryan Robinson
(74) *Attorney, Agent, or Firm* — Nath, Goldberg & Meyer; Jerald L. Meyer

(57) ABSTRACT

A speaker includes a flange portion, a locking member and a connecting portion. The flange portion includes a penetration hole. The locking member is arranged in the penetration hole and includes a locking portion that protrudes from the flange portion and is to be locked in a mounting hole in a prescribed size. The connecting portion connects an end surface facing the penetration hole with the locking member and is to be cut by a hand tool.

7 Claims, 26 Drawing Sheets

(51) Int. Cl.
  *F16B 21/08*  (2006.01)
  *F16B 5/10*  (2006.01)
  *H04R 9/02*  (2006.01)

(52) U.S. Cl.
  CPC .......... *F16B 21/082* (2013.01); *F16B 21/086* (2013.01); *F16B 21/09* (2013.01); *H04R 9/02* (2013.01); *H04R 2201/021* (2013.01); *H04R 2499/13* (2013.01)

(56) References Cited

U.S. PATENT DOCUMENTS

| | | | | |
|---|---|---|---|---|
| 5,013,174 A | * | 5/1991 | Marabotto | F16B 5/02 29/402.06 |
| 5,168,527 A | * | 12/1992 | Loya | H04R 1/025 381/386 |
| 5,583,945 A | * | 12/1996 | Iijima | H04R 9/06 381/386 |
| 6,827,316 B1 | * | 12/2004 | Arai | B60R 16/0215 24/16 PB |
| 7,717,227 B2 | * | 5/2010 | Kusano | H04R 1/025 181/148 |
| 7,988,105 B2 | * | 8/2011 | Kamiya | F16B 21/088 248/71 |
| 10,085,079 B2 | * | 9/2018 | Sato | H04R 7/02 |
| 2007/0040411 A1 | * | 2/2007 | Dauvergne | B60J 5/0416 296/146.7 |
| 2012/0056053 A1 | * | 3/2012 | Wu | H04R 1/025 248/224.8 |
| 2013/0031756 A1 | * | 2/2013 | Yuen | F16B 5/0642 24/702 |
| 2018/0009392 A1 | * | 1/2018 | Yokota | B60R 11/0217 |

FOREIGN PATENT DOCUMENTS

| | | |
|---|---|---|
| JP | S63-86409 U | 6/1988 |
| JP | 4603829 B2 | 10/2010 |
| WO | 2010/002280 A1 | 1/2010 |

* cited by examiner

SPEAKER AND SPEAKER MOUNTING STRUCTURE

CROSS REFERENCE TO RELATED APPLICATION

This is a continuation application based on PCT application No. PCT/JP2017/030904 filed on Aug. 29, 2017, which claims the benefit of priority from Japanese Patent Applications No. 2016-175530 filed on Sep. 8, 2016, and No. 2016-185668 filed on Sep. 23, 2016, the entire contents of which are incorporated by reference herein.

BACKGROUND

The present invention relates to a speaker and a speaker mounting structure.

Japanese Patent No. 4603829 (Patent Literature 1) describes a structure for mounting a speaker on a plate-like mounted member.

The speaker mounting structure described in Patent Literature 1 interposes a mounting tool made of a resin between the mounted member and a frame of the speaker. The mounting tool includes a locking portion on one end thereof, which is to be locked in a hole formed on the mounted member, and an engaging portion on the other end thereof, which is to be engaged with the frame of the speaker and has a screw hole formed thereon, into which a tapping screw is to be screwed.

When the speaker is mounted on the mounted member, the engaging portion of the mounting tool is first engaged with the frame of the speaker, and the frame is fastened together to the screw hole of the engaging portion by the tapping screw. Then the locking portion of the mounting tool mounted on the speaker is locked in the hole of the mounted member. In this way, the speaker is mounted on the mounted member by means of the mounting tool.

The speaker mounting structure described in Patent Literature 1 needs the mounting tool as a dedicated part for mounting the speaker, in addition to the tapping screw. Accordingly, there is room for improvement in decreasing the number of parts. Moreover, as the tapping screw is made of a metal to secure the intensity, there is room for improvement in reducing the weight. In particular, the improvement is greatly desired in onboard use.

Moreover, the work of mounting the speaker on the mounted member needs a lot of work including locking the mounting tool with the mounted member, engaging the speaker with the mounting tool, and screwing the tapping screw. Accordingly, there is room for improvement in reducing the number of steps in the work.

SUMMARY

According to a first aspect of the embodiments, there is provided a speaker including: a flange portion including a penetration hole; a locking member arranged in the penetration hole and including a locking portion that protrudes from the flange portion and is configured to be locked in a mounting hole in a prescribed size; and a connecting portion connecting an end surface that faces the penetration hole with the locking member and configured to be cut by a hand tool.

According to a second aspect of the embodiments, there is provided a speaker including: a flange portion including a penetration hole; a locking member including a base portion that is arranged in the penetration hole and has a first hole extending in the same direction as the penetration hole, and a locking portion that is connected to the base portion, protrudes from the flange portion and is configured to be locked in a mounting hole in a prescribed size; a connecting portion connecting an end surface that faces the penetration hole with the base portion and configured to be cut by a hand tool; and a pocket portion including a bottom, the pocket portion formed on the flange portion and configured to receive therein the base portion separated by cutting the connecting portion, wherein the pocket portion includes a second hole on the bottom, the second hole formed such that the first hole of the base portion received in the pocket portion is seen through the second hole.

According to a third aspect of the embodiments, there is provided a speaker mounting structure for mounting a speaker on a mounted member, wherein the speaker including: a flange portion including a penetration hole; a locking member arranged in the penetration hole and including a locking portion that protrudes from the flange portion and is configured to be locked in a mounting hole in a prescribed size; and a connecting portion connecting an end surface that faces the penetration hole with the locking member and configured to be cut by a hand tool, the mounted member includes the mounting hole in the prescribed size, and the speaker is mounted on the mounted member by locking the locking member of the speaker in the mounting hole of the mounted member.

According to a fourth aspect of the embodiments, there is provided a speaker mounting structure for mounting a speaker on a mounted member, wherein the speaker including: a flange portion including a penetration hole; a locking member including a base portion that is arranged in the penetration hole and has a first hole extending in the same direction as the penetration hole, and a locking portion that is connected to the base portion, protrudes from the flange portion and is configured to be locked in a mounting hole in a prescribed size; a connecting portion connecting an end surface that faces the penetration hole with the base portion and configured to be cut by a hand tool; and a pocket portion including a bottom, the pocket portion formed on the flange portion and configured to receive therein the base portion separated by cutting the connecting portion, wherein the pocket portion includes a second hole on the bottom, the second hole formed such that the first hole of the base portion received in the pocket portion is seen through the second hole, the mounted member includes the mounting hole in the prescribed size, and the speaker is mounted on the mounted member by locking the locking member of the speaker in the mounting hole of the mounted member.

According to a fifth aspect of the embodiments, there is provided a mounting structure for mounting a speaker having a flange portion on a mounted member, including: an engaging member including a first engaging portion, a second engaging portion, and a guard portion, wherein while the flange portion is sandwiched between the first engaging portion and the guard portion by engaging the first engaging portion with the flange portion, the speaker is to be mounted on the mounted member by means of the engaging member by engaging the mounted member with the second engaging portion.

DETAILED DESCRIPTION

Speakers and speaker mounting structures according to first to sixth exemplary embodiments of the present invention will be respectively described by means of speakers 51 and 52, and speaker mounting structures STK3 to STK6, as examples. A speaker here means a single item of an electroacoustic transducer, which is widely called as a speaker unit.

First Embodiment

A speaker 51 according to a first exemplary embodiment is a speaker, for example, for a vehicle such as a car, to be mounted on a vehicle frame 61, which is a mounted member. The vehicle frame 61 is a frame of a vehicle door formed by sheet metal working, for example.

Figure 1:
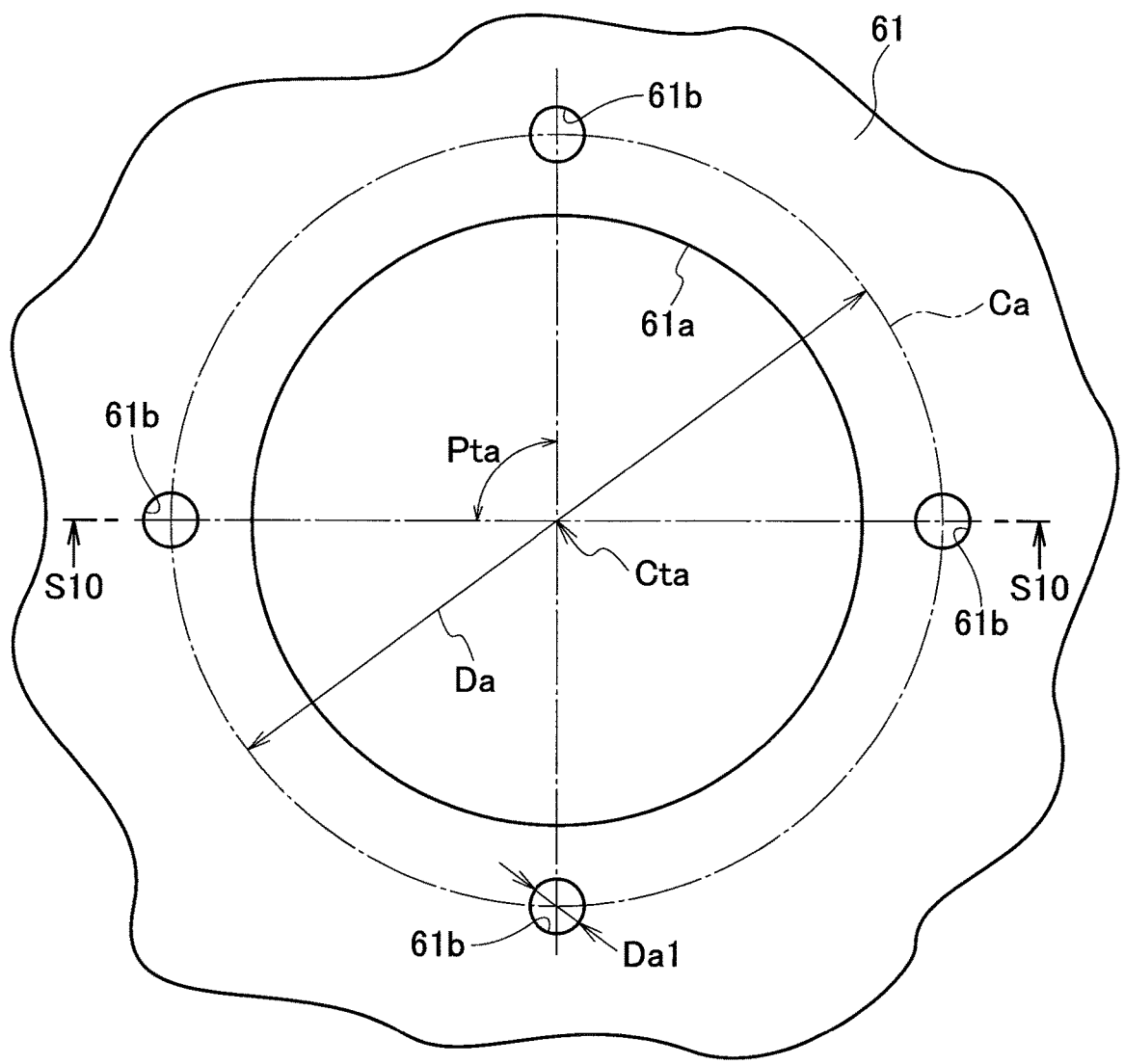
FIG. 1 is a diagram illustrating a vehicle frame on which a speaker according to a first exemplary embodiment of the present invention is to be mounted.

As shown in FIG. 1, a sound emitting hole 61a to pass output sounds from the speaker 51 mounted on the vehicle frame 61, and a plurality of mounting holes 61b in a prescribed size for mounting the speaker 51 are formed on the vehicle frame 61. There are four mounting holes 61b in this example, which are formed on a circumference Ca around a center position Cta of the sound emitting hole 61a with a diameter Da at an angle pitch Pta of 90°.

Figure 2:
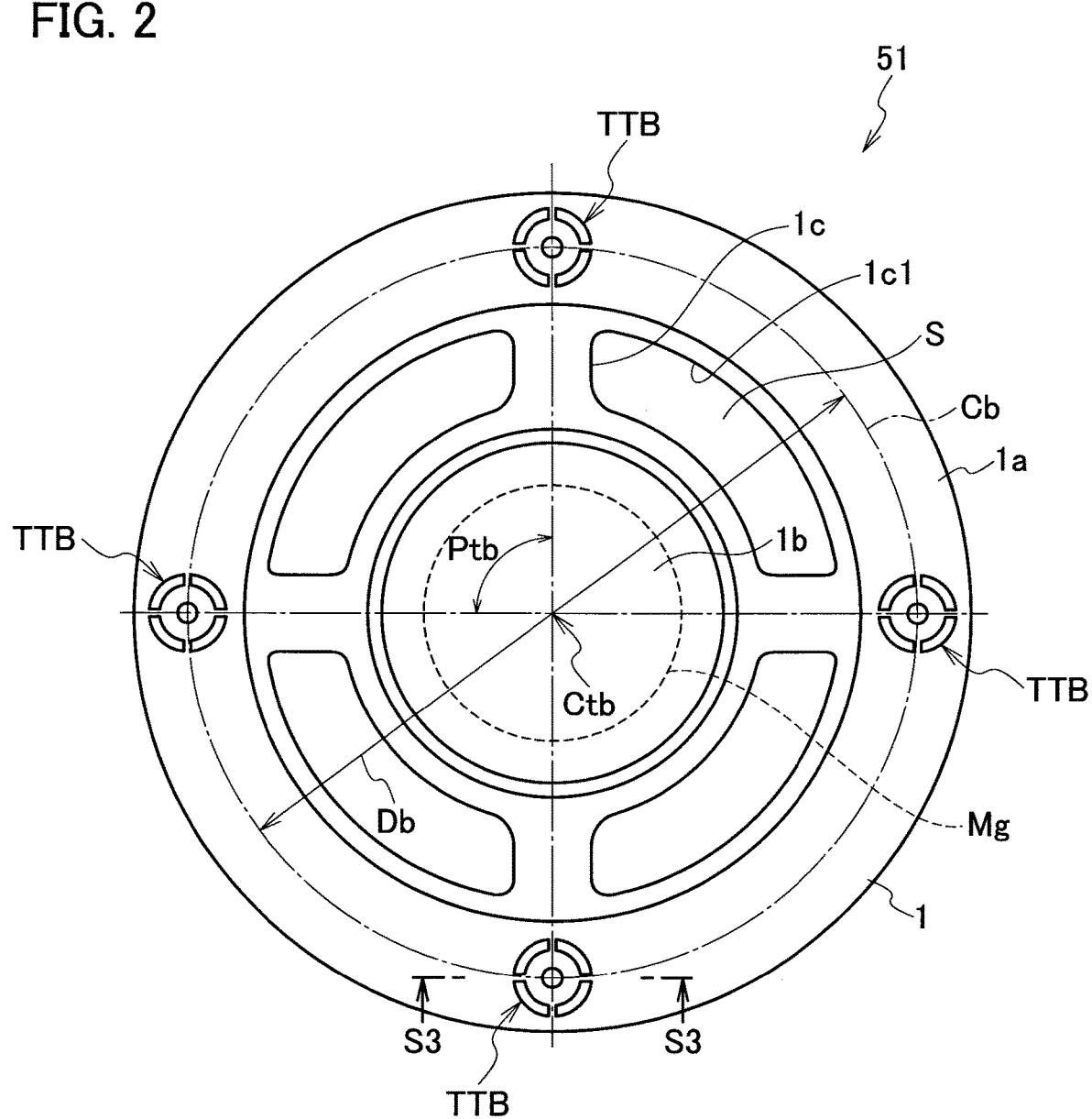
FIG. 2 is a rear view of the speaker according to the first exemplary embodiment.
Figure 6:
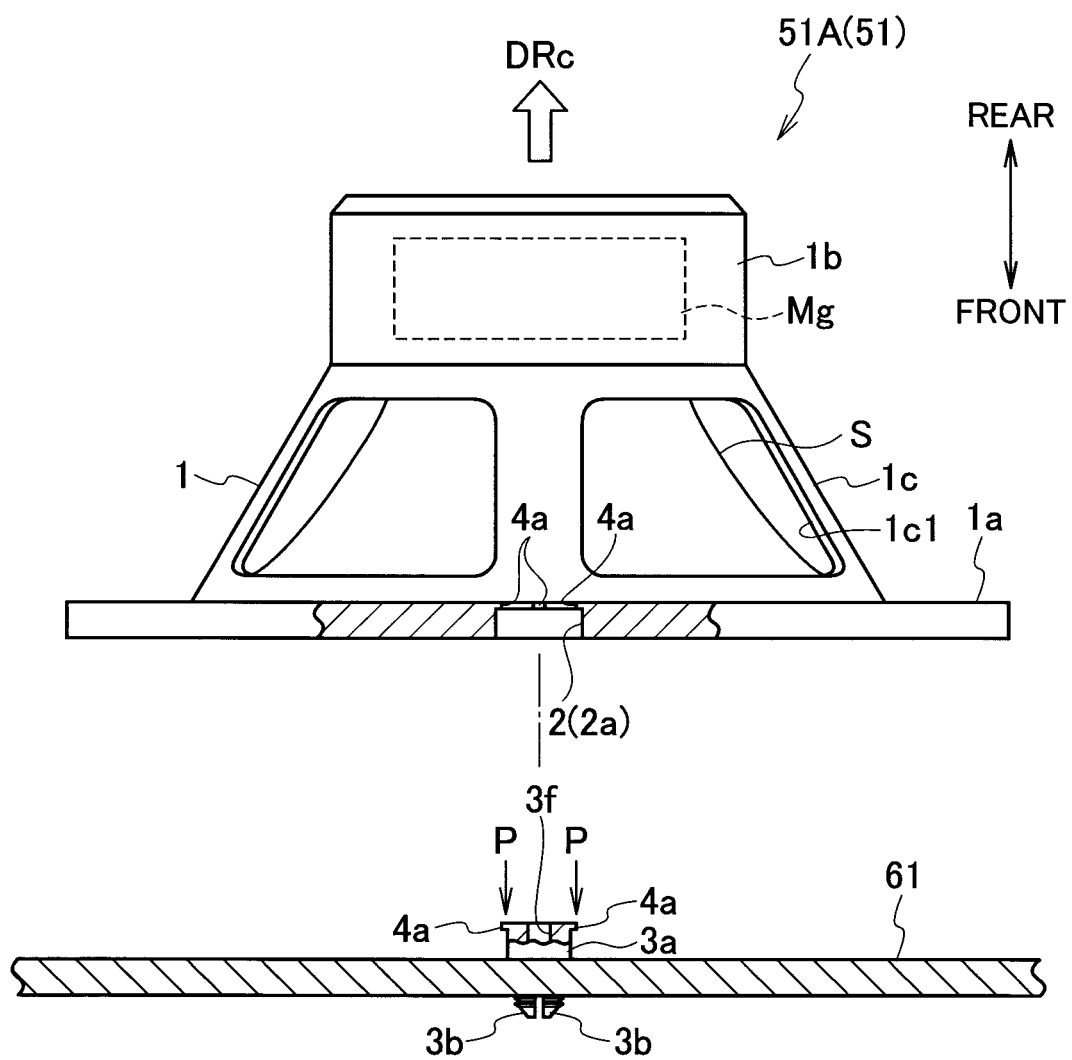
FIG. 6 is a diagram for illustrating separation of the speaker mounted on the vehicle frame according to the first exemplary embodiment.

FIG. 2 is a rear view of the speaker 51. The speaker 51 described in this example is a typical dynamic type speaker including a magnet Mg and a diaphragm S (see also FIG. 6). As will be described by also referring to FIG. 6 illustrating a side view of the speaker 51, the speaker 51 includes a frame 1, which has a flange portion 1a in a circular annular shape, a cover 1b receiving the magnet Mg therein, and a connecting portion 1c connecting the flange portion 1a with the cover 1b and formed to become smaller in an outer diameter toward a side of the cover 1b. A plurality of openings 1c1 is formed on the connecting portion 1c. The diaphragm S in a funnel shape arranged in the speaker 51 is seen through the openings 1c1. The flange portion 1a supports the diaphragm S with its edge.

In the following description, a side on which the magnet Mg is arranged with respect to the flange portion 1a is set as a rear surface side (hereinafter also called as a rear side), and a side opposite to the side on which the magnet Mg is arranged with respect to the flange portion 1a is set as a front surface side (hereinafter also called as a front side) (see FIG. 6). That is, the front side of the paper on FIG. 1 is the rear side.

The frame 1 has at least the flange portion 1a made of a resin. A plurality of mounting portions TTB is provided on the flange portion 1a at an angle pitch Ptb. In this example, the angle pitch Ptb is set to 90° which is equal to the angle pitch Pta. The position of a central axial line CL1 (see FIGS. 3 and 4) of each of the mounting portions TTB is on a circumference Cb around a center position Ctb of the speaker 51 with a diameter Db.

Figure 3:
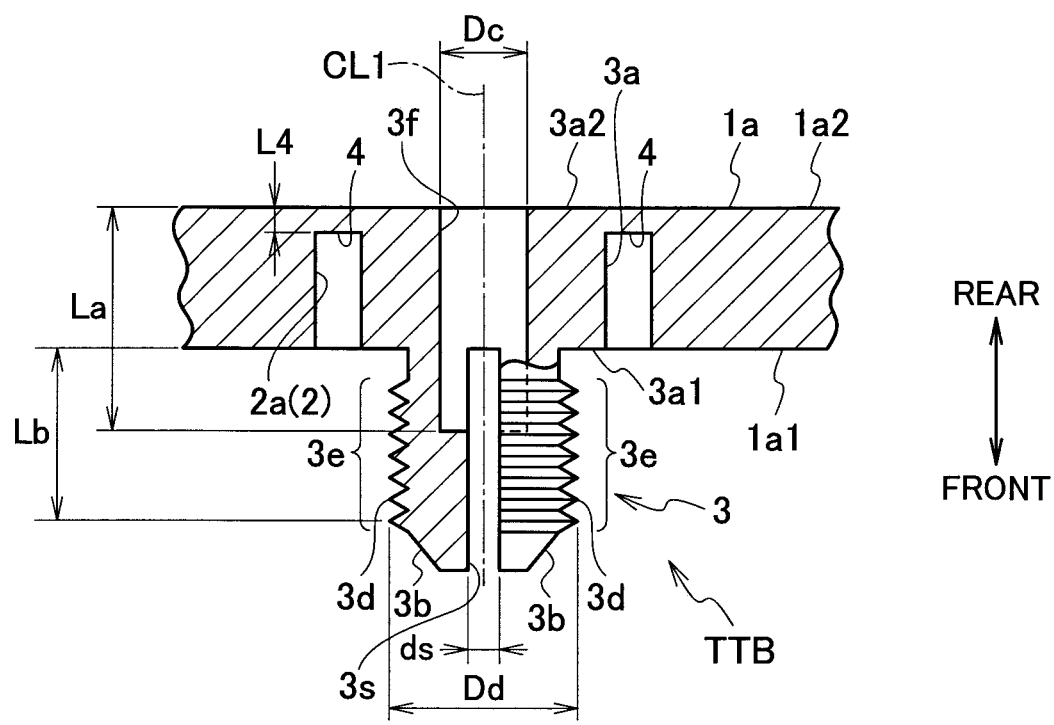
FIG. 3 is a cross-sectional view taken along a line S3-S3 in FIG. 2.
Figure 4:
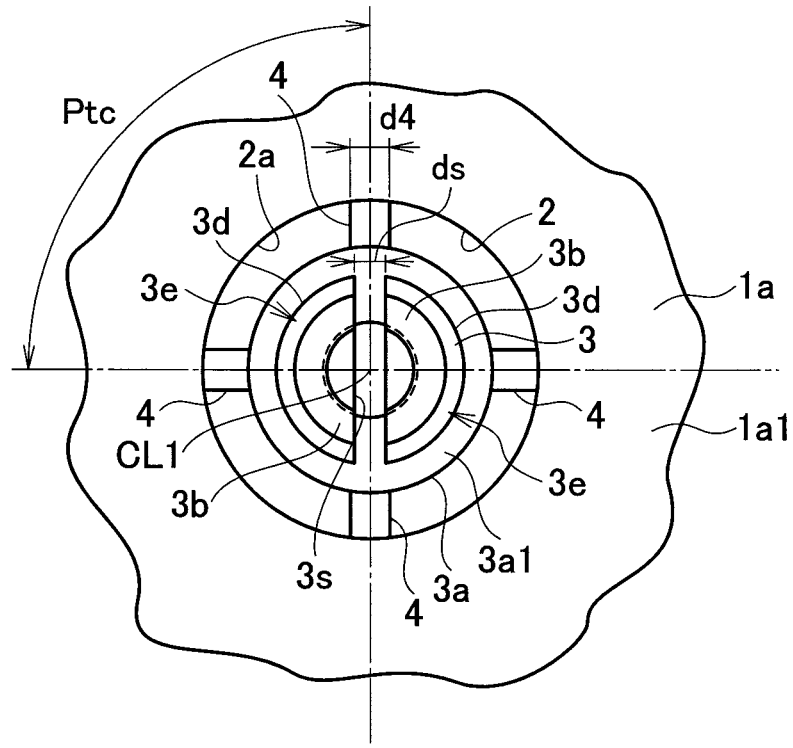
FIG. 4 is a front view of a locking member of the speaker according to the first exemplary embodiment.

One of the mounting portions TTB will be described with reference to FIGS. 2 to 4. FIG. 3 is a cross-sectional view (partial half-sectional view) taken along a line S3-S3 in FIG. 2. FIG. 4 is a front view of the mounting portion TTB.

The mounting portion TTB is configured to include a penetration hole 2 formed on the flange portion 1a, a locking member 3 arranged in the penetration hole 2 and extending in a front-rear direction, and connecting portions 4 to connect the locking member 3 with an end surface 2a (that is, a circumferential surface to form the penetration hole 2) facing the penetration hole 2.

The penetration hole 2 is formed in a round shape viewed from the front side. The locking member 3 includes a base portion 3a at the same position as the flange portion 1a in the front-rear direction, and a pair of locking portions 3b, 3b protruding from the base portion 3a toward the front side.

In detail, the base portion 3a is formed, for example, in a column shape having the same thickness as the flange portion 1a in the front-rear direction. The base portion 3a is connected with the flange portion 1a by the connecting portions 4 such that a front side end surface 3a1 on the front side and a rear side end surface 3a2 on the rear side of the base portion 3a are at the same positions as a surface 1a1 on the front side and a surface 1a2 on the rear side of the flange portion 1a in the front-rear direction, respectively.

When a member protruding in an approximate column shape from the front side end surface 3a1 of the base portion 3a along the central axial line CL1 extending in the front-rear direction of the base portion 3a toward the front side is imaginarily defined, the pair of locking portions 3b, 3b is formed as a remaining portion of the member after a slit 3s having a width ds is formed on the member.

Figure 5:
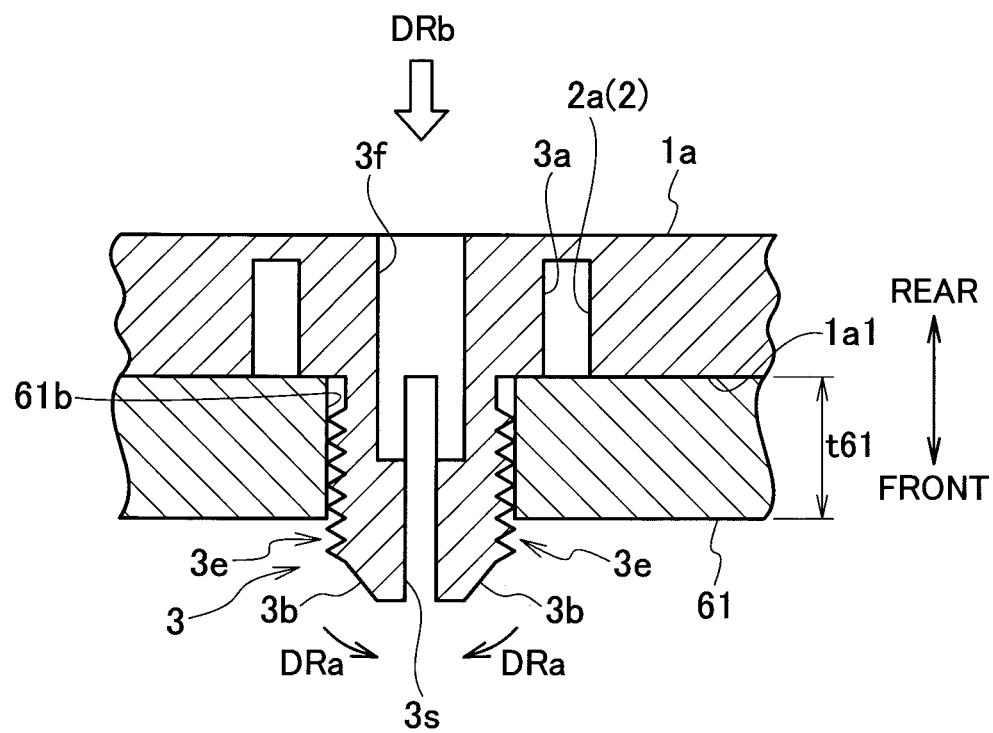
FIG. 5 is a cross-sectional view for illustrating locking state of the locking member according to the first exemplary embodiment and a mounting hole of the vehicle frame.

The pair of locking portions 3b, 3b is provided in a standing condition to face each other across the slit 3s and has flexibility in a direction in which one locking portion 3b approaches the other locking portion 3b (see an arrow DRa in FIG. 5). A plurality of circumferential ribs 3d in an arc shape is arranged on circumferential surfaces of the locking portions 3b, 3b in the front-rear direction. Each of the circumferential ribs 3d is convex outward in a diameter direction to present an approximate triangle shape in a cross section, thereby configuring a pair of concavo-convex portions 3e, 3e. Viewed from the front side, the outline of the circumferential ribs 3d in an external force-free state (natural state) is on the circumference of a circle with a diameter Dd (see FIG. 3).

The locking member 3 includes a hole 3f formed by hollowing the rear side end surface 3a2 toward the front side along the central axial line CL1. In detail, the hole 3f is formed with a diameter Dc larger than the width ds of the slit 3s, and a depth La through the base portion 3a to a midway of the locking portions 3b, 3b.

The plurality of connecting portions 4 is formed around the central axial line CL1 at an angle pitch Ptc. The angle pitch Ptc is set to 90° in this example. The connecting portions 4 are formed to connect the base portion 3a with the end surface 2a, which faces the penetration hole 2, at the most rear side of the base portion 3a of the locking member 3, for example. The connecting portions 4 are formed in a shape (width d4: see FIG. 4; thickness L4: see FIG. 3) having shearing strength suitable for being cut by a hand tool for cutting. The hand tool for shearing includes a nipper, a cutter, or scissors, for example, which is a tool for cutting a member by shearing by hand. The connecting portions 4 may be cut by shearing force given by pressing the locking member 3 by hand with respect to the flange portion 1a toward the front side or the rear side.

The locking member 3 of the mounting portion TTB is to be mounted in the mounting hole 61b of the vehicle frame 61. The size and the shape of the mounting portion TTB is set in correspondence with those of the mounting hole 61b as follows.

The diameter Db of the circumference Cb related to positions at which the mounting portions TTB are arranged is equal to the diameter Da of the circumference Ca related to positions of the mounting holes 61b. The angle pitch Ptb, which is an angle pitch for arranging the mounting portions TTB, is equal to the angle pitch Pta related to the positions of the mounting holes 61b, as previously described. The diameter Dd (see FIG. 3) related to the circumferential ribs 3d, 3d of the locking portions 3b, 3b is set to be slightly larger than a diameter Da1 (see FIG. 1) of the mounting hole 61b. A distance Lb, which is shown in FIG. 3, between a position farthest from the base portion 3a on the concavo-convex portions 3e, 3e of the locking portion 3b, 3b and the surface 1a1 of the flange portion 1a in the front-rear direction is set to be at least equal to or more than a half of a thickness t61 (see FIG. 5) of the vehicle frame 61, which is the mounted member. The distance Lb is preferably equal to or more than the thickness t61.

With these settings, the speaker 51 is mounted on the vehicle frame 61, which is the mounted member, by locking the locking members 3 of the flange portion 1a in the mounting holes 61b, respectively. FIG. 5 is a cross-sectional view illustrating a locking state of the locking members 3 in the mounting holes 61b where the locking member 3 is locked in the mounting hole 61b, that is, the speaker 51 is mounted on the vehicle frame 61.

When the speaker 51 is to be mounted on the vehicle frame 61, the speaker 51 is first arranged such that the flange portion 1a and the vehicle frame 61 are approximately parallel each other on the rear side of the vehicle frame 61, and the locking members 3 are aligned to correspond to the mounting holes 61b in a circumferential direction, respectively.

As shown in FIG. 5 with an arrow DRb, the flange portion 1a is then brought closer to the vehicle frame 61, and each of the locking members 3 is inserted into the corresponding mounting holes 61b. As the pair of locking portions 3b, 3b of the locking member 3 in a natural state is firm fitting to the mounting hole 61b, the insertion of the locking portions 3b, 3b progresses while the locking portions 3b, 3b flexibly bend in a direction in which the locking portions 3b, 3b approach each other (see arrows DRa in FIG. 5). The insertion of the locking portions 3b, 3b completes when the surface 1a1 of the flange portion 1a comes in contact with the vehicle frame 61.

FIG. 5 illustrates an insertion completed state in which the pair of concavo-convex portions 3e, 3e is locked in the mounting hole 61b with convex portions of the concavo-convex portions 3e, 3e biting into the internal circumferential surface of the mounting hole 61b. Moreover, the concavo-convex portions 3e, 3e are pressed against an end surface facing the mounting hole 61b by elastic repulsive power due to the bending of the locking portions 3b, 3b, and consequently the biting becomes stronger and the locking becomes more stable.

As described above, the speaker 51 is mounted on the mounted member (vehicle frame 61) without using a dedicated mounting tool or screw parts such as a tapping screw. Moreover, the mounting work is only to adjust the position of the speaker 51 and to push the speaker 51. That is, the speaker 51 is to be mounted on the mounted member with less number of parts and less work.

The speaker 51 mounted on the mounted member is easily removed from the mounted member (vehicle frame 61) for separate disposal. That is, as shown in FIG. 6, cutting the connecting portions 4 of each locking member 3 at the corresponding positions P and moving the speaker 51 toward the rear side (see an arrow DRc) enables parts excluding the locking members 3 (hereinafter called as a locking member-less speaker 51A) in the speaker 51 mounted on the vehicle frame 61, to be separated from the vehicle frame 61. By this separation, the locking members 3 remain on the vehicle frame 61 in locked state. The connecting portions 4, which are cut, are hereinafter called as remaining cut portions 4a.

The connecting portions 4, as previously described, are formed narrow in width and thin in thickness to be cut by a tool with hand such as a nipper or a cutter. The connecting portions 4 are preferably formed at the most rear side of the flange portion 1a for easy cutting.

Second Embodiment

Next, a speaker 52 according to a second exemplary embodiment will be described. The speaker 52 further includes screw mounting portions TTB2 with respect to the speaker 51, whose number is the same or more than that of the mounting portions TTB. In the following description, a portion of the speaker 52 that is common to the speaker 51 will be denoted by the same reference sign as the speaker 51.

Figure 7:
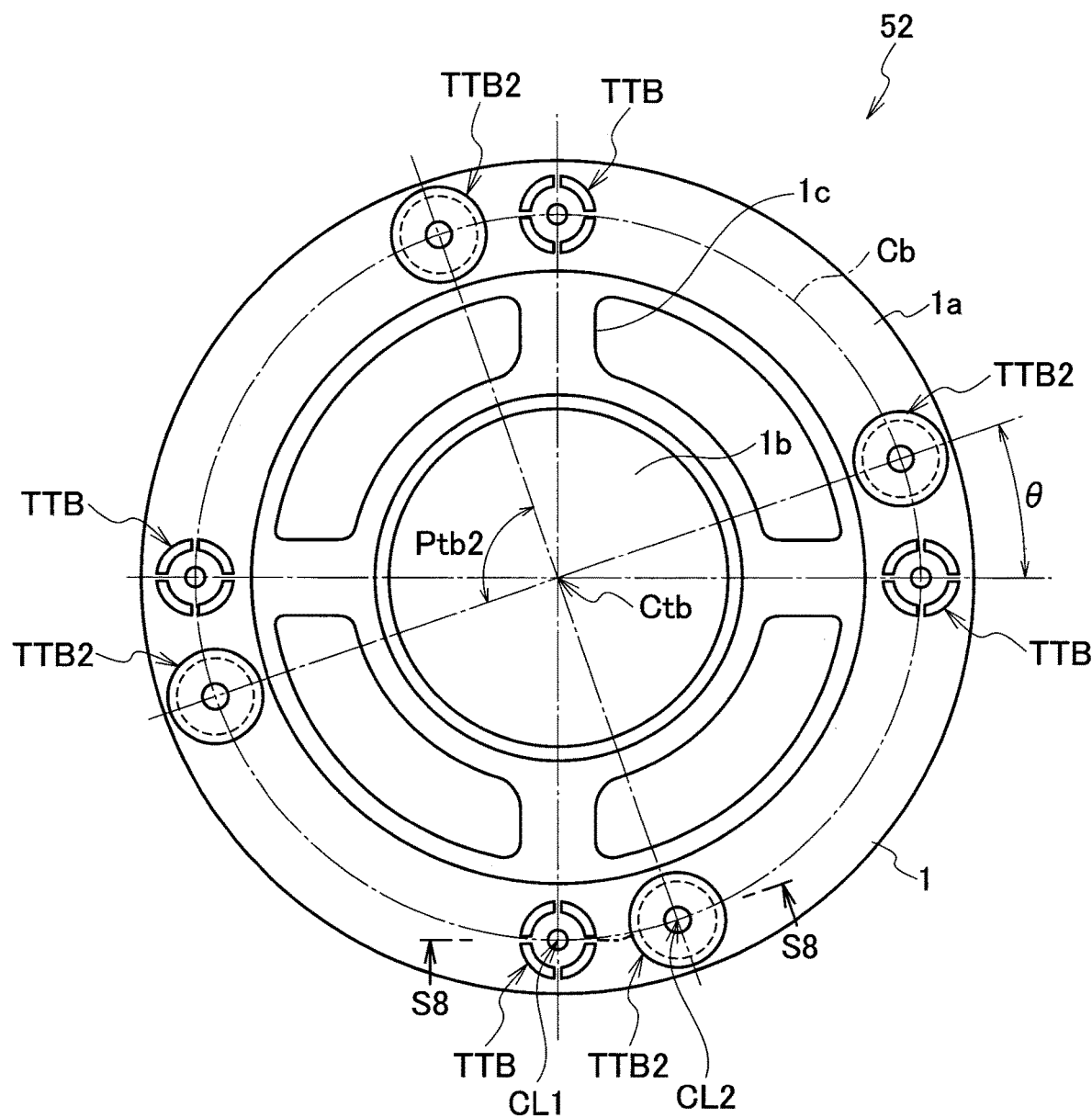
FIG. 7 is a rear view of a speaker according to a second exemplary embodiment.

FIG. 7 is a rear view of the speaker 52. FIG. 7 is comparable with FIG. 2. The screw mounting portions TTB2 are arranged on the circumference Cb, which is the same for the mounting portions TTB, at positions shifted in the clockwise direction or in the counterclockwise direction around the center position Ctb by an angle θ from the positions of the mounting portions TTB, respectively.

In an example shown in FIG. 7, the angle θ is set in the counterclockwise direction. The value of the angle θ is set freely between 0° and 90° as long as the screw mounting portion TTB2 does not interfere with the mounting portion TTB.

Figure 8:
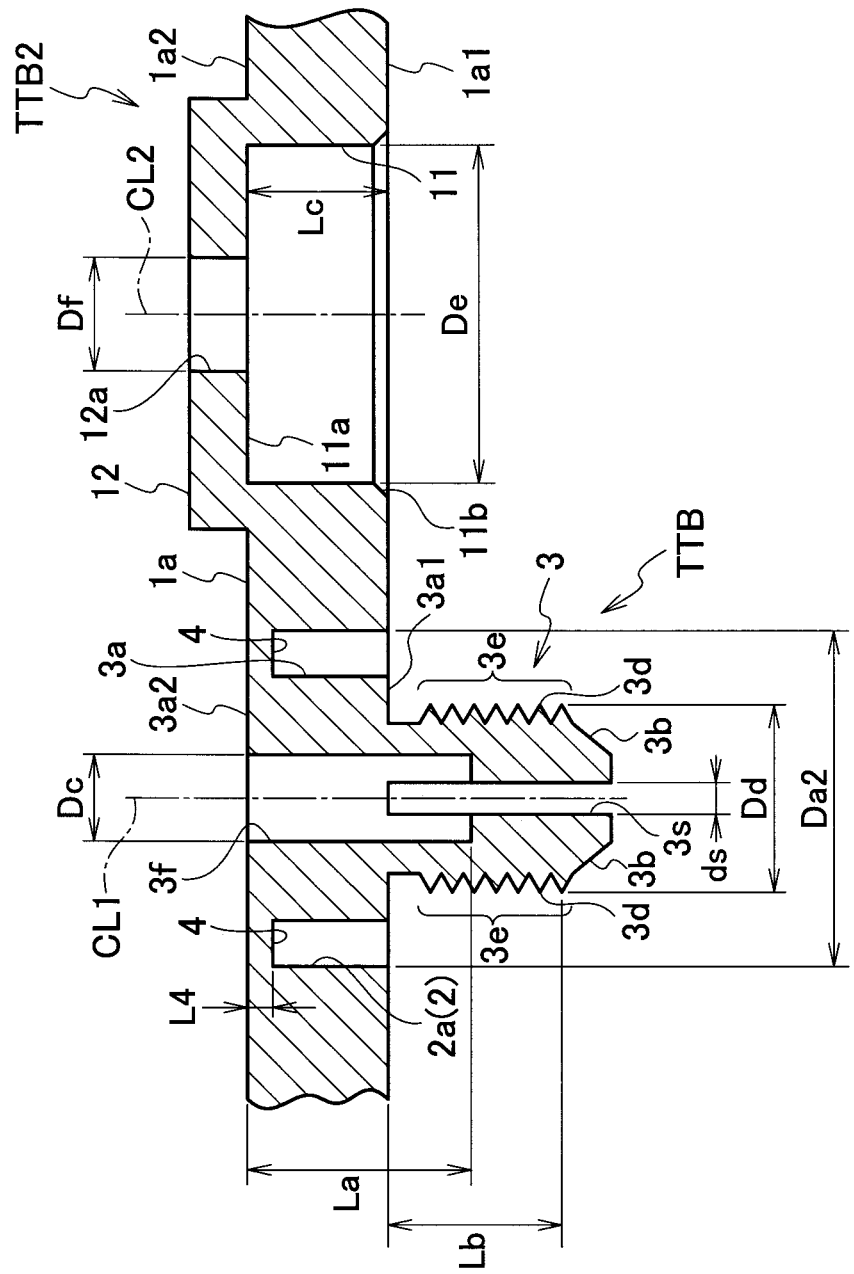
FIG. 8 is a cross-sectional view taken along a line S8-S8 in FIG. 7.
Figure 9:
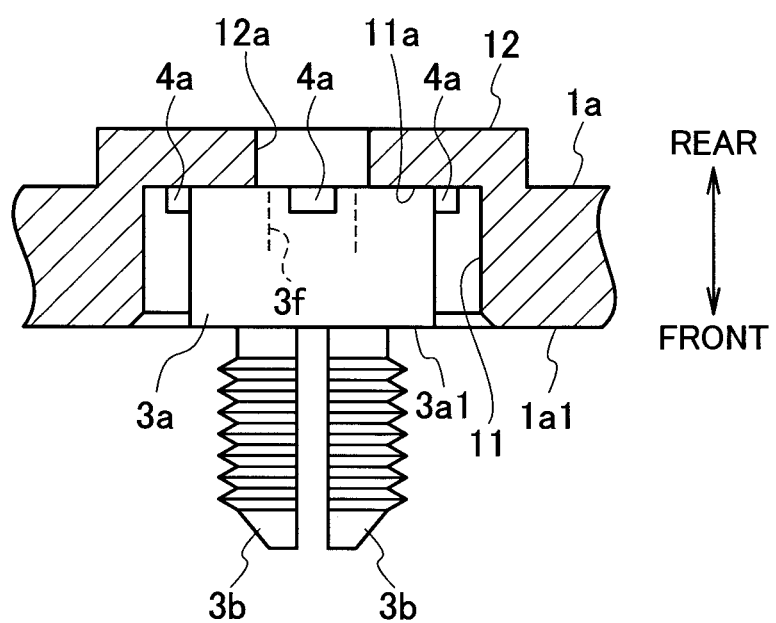
FIG. 9 is a diagram for illustrating a state in which a base portion of a locking member is received in a pocket portion of a screw mounting portion provided on the speaker according to the second exemplary embodiment.

Details of one of the screw mounting portions TTB2 will be described with reference to FIGS. 8 and 9. FIG. 8 is a cross-sectional view taken along a line S8-S8 in FIG. 7. FIG. 9 illustrates a relationship between the screw mounting portion TTB2 shown in FIG. 8 and the locking portion 3.

The screw mounting portion TTB2 includes a pocket portion 11 open to the surface 1a1 on the front side of the flange portion 1a, and a protruding portion 12 protruding toward the rear side to correspond to the pocket portion 11. In particular, the pocket portion 11 is formed by hollowing the surface 1a1 on the front side of the flange portion 1a toward the rear side to be a bottomed hole having a bottom portion 11a. The pocket portion 11 is, for example, a round hole as in this example. A penetration hole 12a is formed on the protruding portion 12 along a central axial line CL2 of the pocket portion 11. A chamfering portion 11b is formed on the edge of the opening portion of the pocket portion 11.

The size and the shape of the pocket portion 11 are set on the basis of the shape of the base portion 3a of the locking member 3. Specifically, a depth Lc of the pocket portion 11 is formed equal to or smaller than the thickness of the base portion 3a of the locking member 3. As previously described, in this example, the thickness of the base portion 3a is equal to that of the flange portion 1a. Accordingly, the depth Lc is set to be equal to or smaller than the thickness t61 of the flange portion 1a. It is noted that the depth Lc of the pocket portion 11 may be more than the thickness of the base portion 3a of the locking member 3. A diameter (inside diameter) De of the pocket portion 11 is equal to or more than the diameter Da2 (inside diameter) of the penetration hole 2 formed on the flange portion 1a. This is for receiving the base portion 3a including the remaining cut portions 4a of the connecting portions 4 within the pocket portion 11. The protruding portion 12 is provided to ensure the thickness necessary for forming the pocket portion 11.

With these settings, the screw mounting portion TTB2 receives the base portion 3a of the locking member 3 in the pocket portion 11, as shown in FIG. 9. While the base portion 3a is received in the pocket portion 11, and the base portion 3a and the bottom portion 11a of the pocket portion 11 are in contact with each other, the front side end surface 3a1 of the base portion 3a becomes the same level as the surface 1a1 on the front side of the flange portion 1a or protrudes toward the front side.

Moreover, an inside diameter of the penetration hole 12a of the protruding portion 12 is sufficiently larger than that of the hole 3f of the base portion 3a. In particular, even though a position where the base portion 3a is received within the pocket portion 11 is shifted in proportion to the length of the remaining cut portions 4a, the whole of the hole 3f is seen from the penetration hole 12a.

The above-described configuration enables the speaker 52 to be mounted on and then separated from the vehicle frame 61, which is the mounted member, in the same way as the speaker 51. Moreover, as the speaker 52 includes the screw mounting portions TTB2, the separated portion is remounted on the vehicle frame 61 by screws. This mounting, separation, and remounting will be described with reference to FIGS. 10 to 12.

Figure 10:
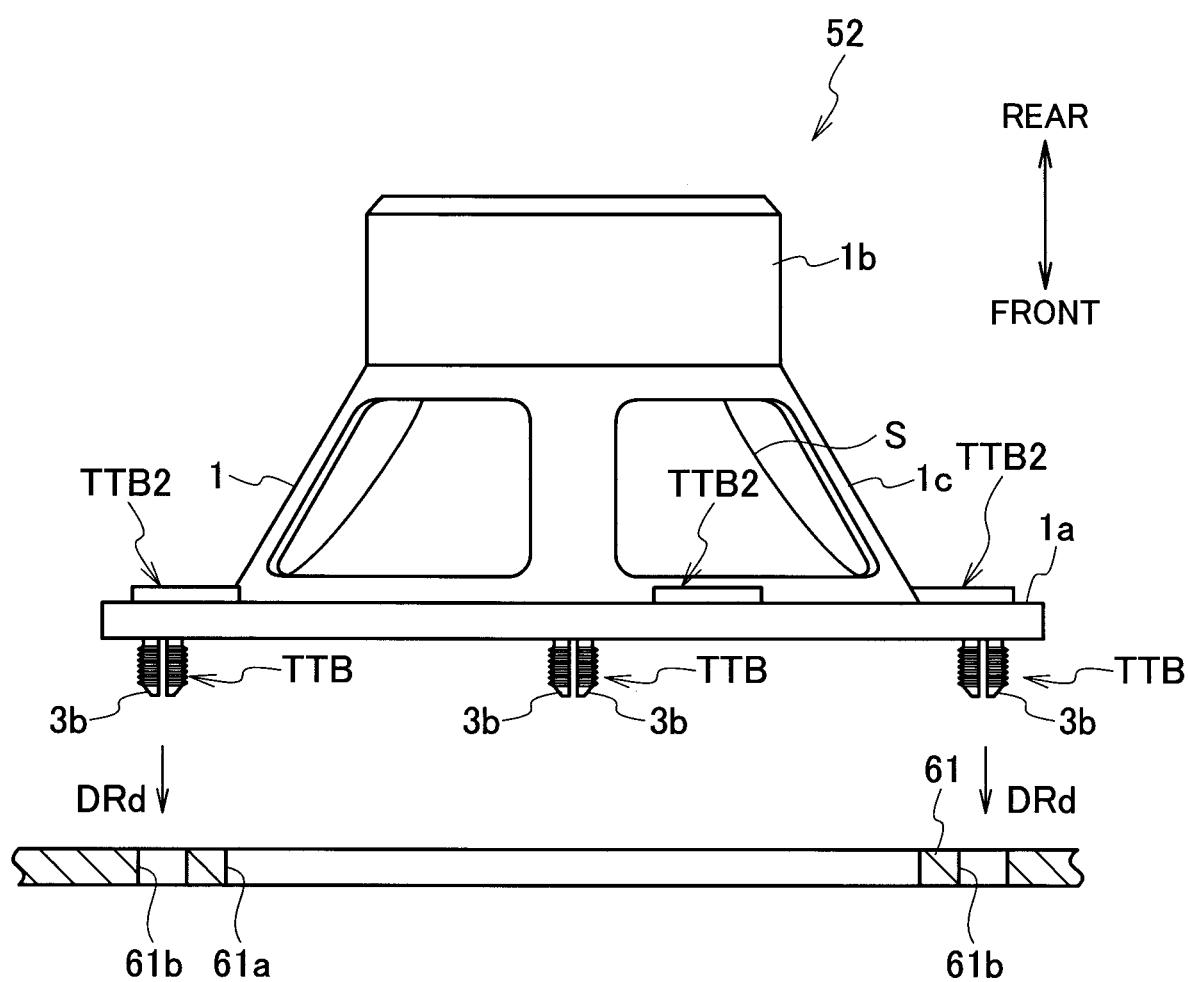
FIG. 10 is a diagram for illustrating work of mounting the speaker according to the second exemplary embodiment on the vehicle frame.

FIG. 10 is a side view for illustrating the work of mounting the speaker 52 on the vehicle frame 61. In FIG. 10, the vehicle frame 61 is shown in a cross-sectional view taken along a line S10-S10 in FIG. 1. First work of mounting the speaker 52 on the vehicle frame 61 is the same as that of mounting the speaker 51.

That is, as shown in FIG. 10, first, the mounting portions TTB are thrusted into the mounting holes 61b, respectively (see arrows DRd). Then, as previously described, the connecting portions 4 of each locking member 3 are cut, the locking members 3 are left on the vehicle frame 61, and the speaker 52 excluding the locking members 3 (hereinafter, called as a locking member-less speaker 52A) is separated from the vehicle frame 61.

Figure 11:
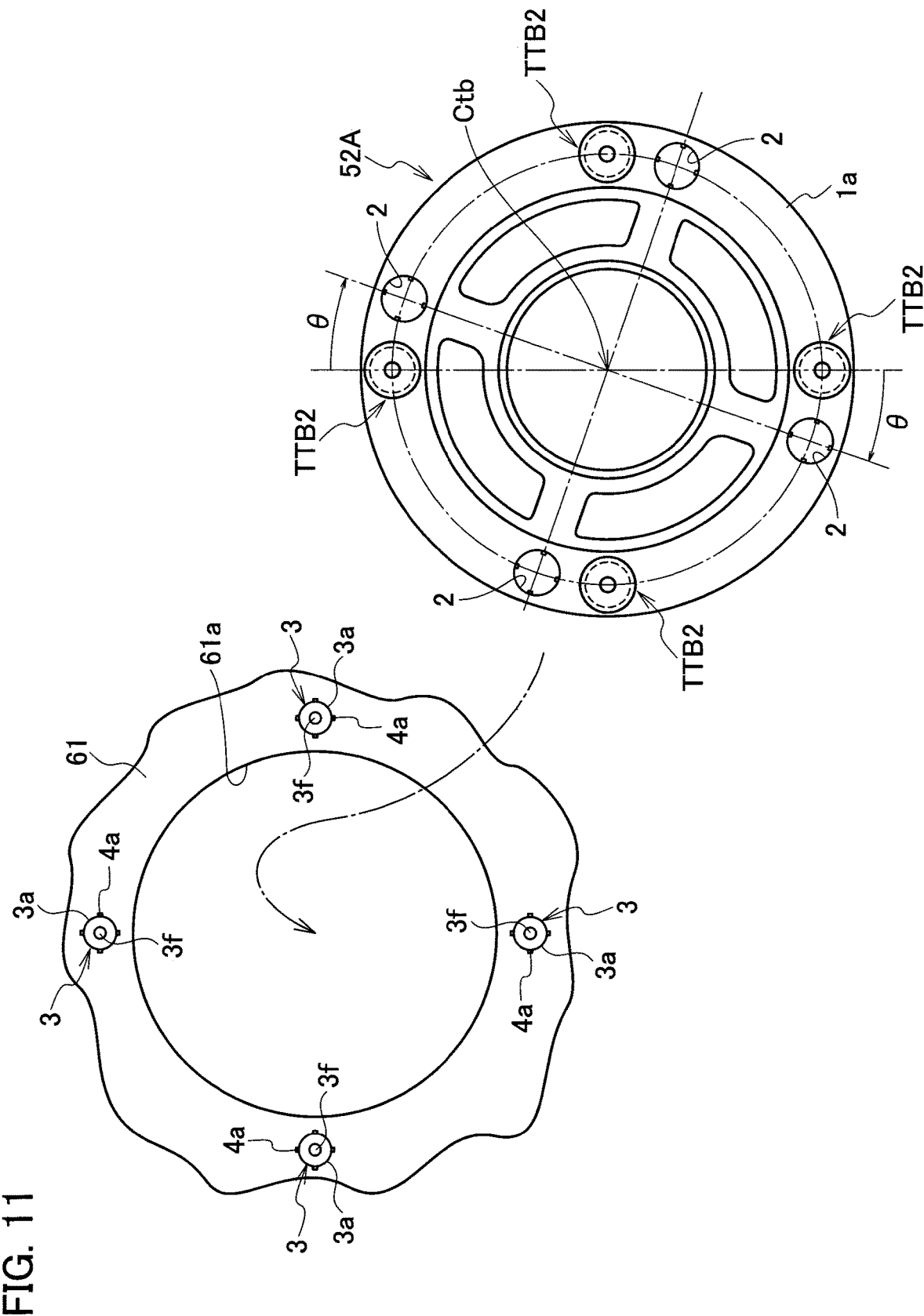
FIG. 11 is a rear view illustrating a state in which the speaker according to the second exemplary embodiment is separated as a locking member-less speaker from the vehicle frame.

FIG. 11 is a rear view showing a state in which the speaker 52 is separated from the vehicle frame 61 as the locking member-less speaker 52A. The locking members 3 locked in the mounting holes 61b are left on the vehicle frame 61.

Remounting of the locking member-less speaker 52A on the vehicle 61 is first performed by rotating the locking member-less speaker 52A, which is at the removed position, around the center position Ctb in the clockwise direction of FIG. 11 by the angle θ such that the screw mounting portions TTB2 correspond to the locking members 3 left on the vehicle frame 61, respectively. Then, the locking memberless speaker 52A is applied to the vehicle frame 61 such that the locking members 3 enter the pocket portions 11 of the screw mounting portions TTB2, respectively. As the chamfering portion 11b is formed on each of the pocket portions 11, the locking members 3 easily go into the pocket portions 11.

Figure 12:
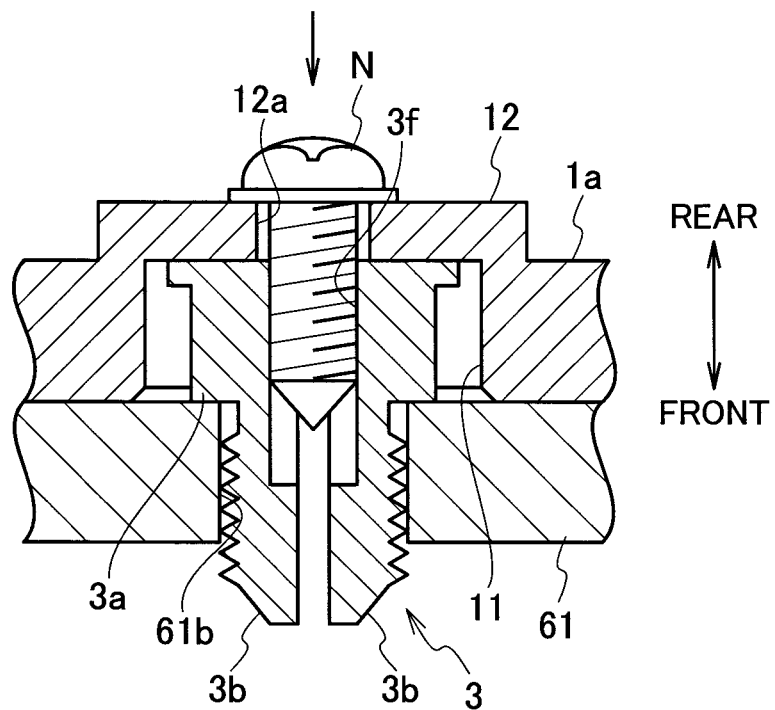
FIG. 12 is a cross-sectional view for illustrating a remounted state at the screw mounting portion according to the second exemplary embodiment.

Then, as shown in FIG. 12, a tapping screw N is screwed into the hole 3f of the locking member 3, which goes into the pocket portion 11 to be received in the pocket portion 11, through the penetration hole 12a of the protruding portion 12 of the screw mounting portion TTB2. This securely fastens the flange portion 1a to each of the locking members 3 locked in the vehicle frame 61, and the speaker 52 is thus remounted on the vehicle frame 61 as the locking memberless speaker 52A.

The speaker 52 of the second exemplary embodiment is also mounted on the mounted member (vehicle frame 61) without using a dedicated mounting tool. Moreover, the mounting work is only to adjust the position of the speaker 52 and to push the speaker 52. That is, the speaker 52 is to be mounted on the mounted member with less number of parts and less work. Moreover, though using the tapping screws, the speaker 52 is remounted without using a dedicated mounting tool after the separation, thereby having outstanding maintainability.

Third Embodiment

As a third exemplary embodiment, a speaker mounting structure STK3 in which a speaker 53 is to be mounted on the mounted member using mounting pins TP1 and no screws will be described. The speaker 53 is, for example, a speaker for a vehicle such as a car, and the mounted member is the vehicle frame 61 which is the same as that of the first and the second exemplary embodiments shown in FIG. 1. The vehicle frame 61 is a frame of a vehicle door which is made of sheet metal, for example.

As shown in FIG. 1, the sound emitting hole 61a to pass output sounds from the speaker 51 (speaker 53) mounted on the vehicle frame 61, and the plurality of mounting holes 61b in a prescribed size for mounting the speaker 51 (speaker 53) is formed on the vehicle frame 61 as the mounted member. There are four mounting holes 61b in this example, which are formed on the circumference Ca around the center position Cta of the sound emitting hole 61a with the diameter Da at the angle pitch Pta of 90°.

Figure 14:
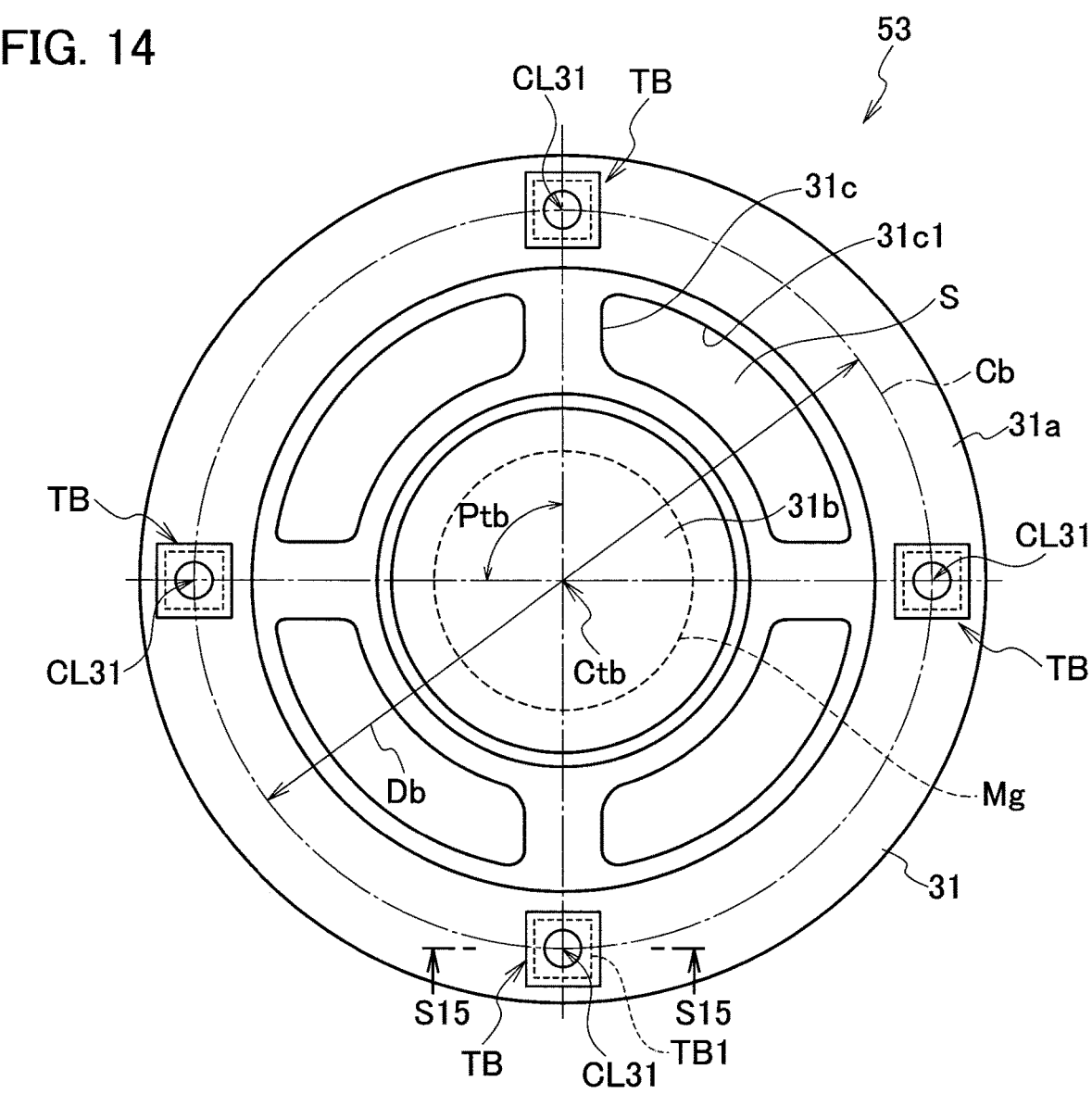
FIG. 14 is a rear view of a speaker to be applied to a speaker mounting structure according to a third exemplary embodiment of the present invention.
Figure 17:
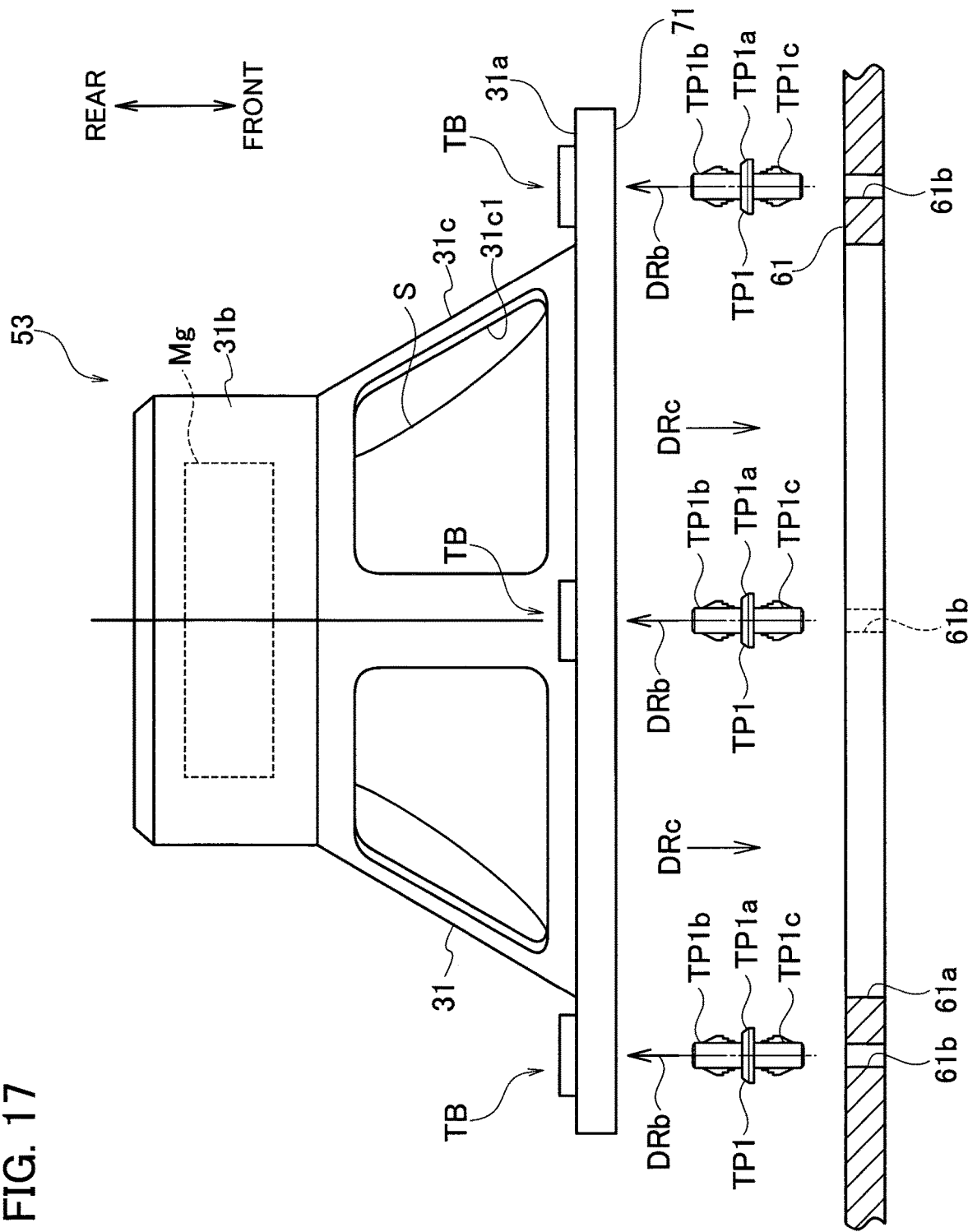
FIG. 17 is a diagram for illustrating mounting steps in the speaker mounting structure according to the third embodiment.

FIG. 14 is a rear view of the speaker 53. The speaker 53 described in this example is a typical dynamic type speaker including the magnet Mg and the diaphragm S (see also FIG. 17). As will be described by also referring to FIG. 17 illustrating a side view of the speaker 53, the speaker 53 includes a frame 31 which has a flange portion 31a in a circular annular shape, a cover 31b receiving the magnet Mg therein, and a connecting portion 31c connecting the flange portion 31a with the cover 31b and formed to become smaller in the outer diameter toward a side of the cover 31b. A plurality of openings 31c1 is formed on the connecting portion 31c. The diaphragm S in a funnel shape arranged in the speaker 53 is seen through the openings 31c1. The flange portion 31a supports the diaphragm S with its edge. The frame 31a has at least the flange portion 31a made of resin.

In the following description, a side on which the magnet Mg is arranged with respect to the flange portion 31a is set as the rear side, and a side opposite to the side on which the magnet Mg is arranged with respect to the flange portion 31a is set as the front side (see FIG. 17). That is, the front side of the paper on FIG. 14 is the rear side.

As shown in FIG. 14, a plurality of mounting portions TB is provided on the flange portion 31a at the angle pitch Ptb. In this example, the angle pitch Ptb is set to 90° which is equal to the angle pitch Pta. The position of a central axial line CL31 (see FIG. 14) of each of the mounting portions TB is on the circumference Cb around the center position Ctb of the speaker 53 with the diameter Db. A packing 71 formed in a ring shape and elastically deformable at least in the thickness direction (see FIG. 15) is mounted on a surface 31a1 of the flange portion 31a on the front side (see FIG. 15). The packing 71 is made of a sheet material of a resin foam having compressive elasticity, for example.

Figure 15:
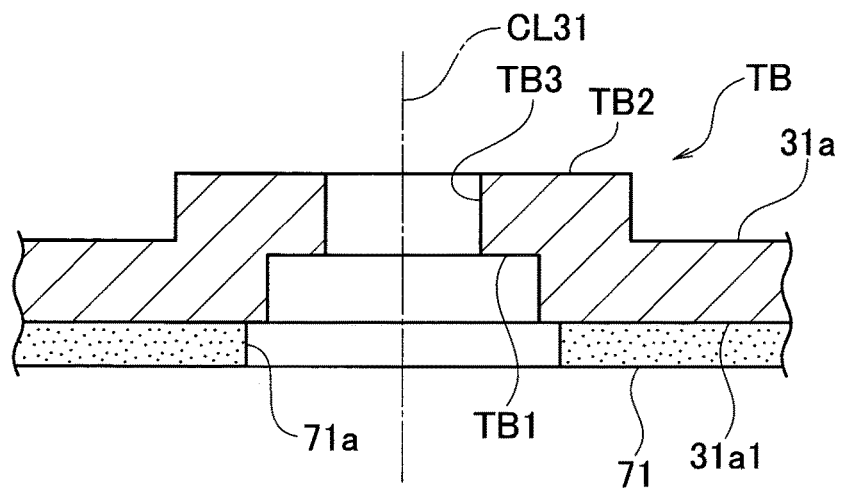
FIG. 15 is a cross-sectional view taken along a line S15-S15 in FIG. 14.

FIG. 15 is a cross-sectional view taken along a line S15-S15 in FIG. 14 to illustrate one of the mounting portions TB.

The mounting portion TB includes a concave portion TB1 which is concave in a rectangular shape from the surface 31a1 of the flange portion 31a on the front side toward the rear side, a protruding portion TB2 which protrudes toward the rear side to correspond to the concave portion TB1 to ensure the thickness, and a penetration hole TB3 which is formed along a central axial line CL31 on the protruding portion TB2. Moreover, the mounting portion TB includes an opening portion 71a on the packing 71, which is formed along the central axial line CL31 to see the whole of the concave portion TB1.

The penetration hole TB3 is formed in a round shape viewed from the front side.

Figure 16B:
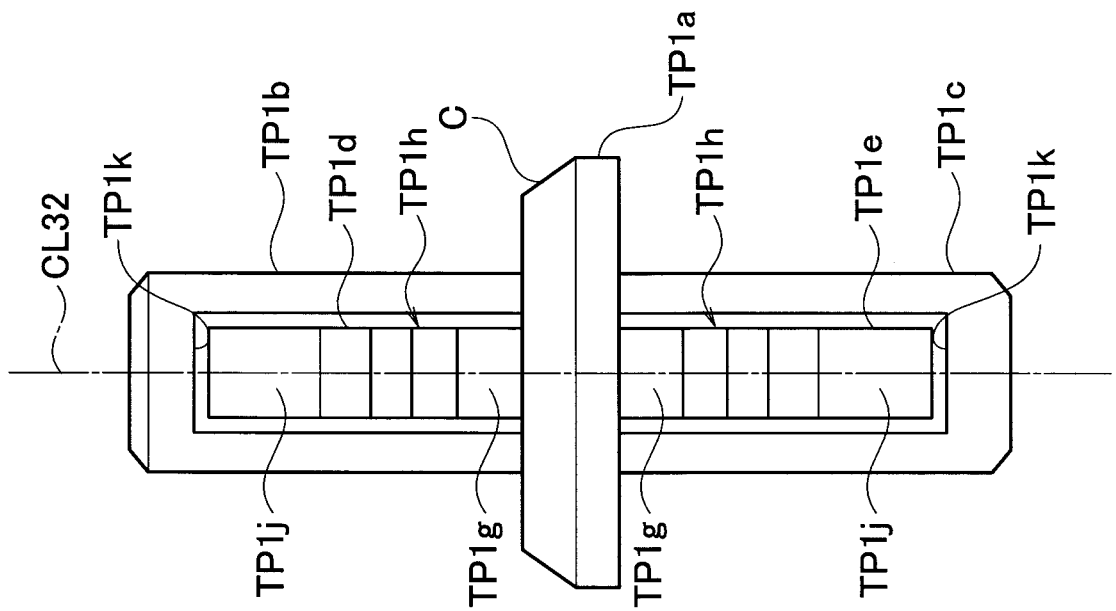
FIG. 16B is a side view of the mounting pin viewed from right side in FIG. 16A.
Figure 16A:
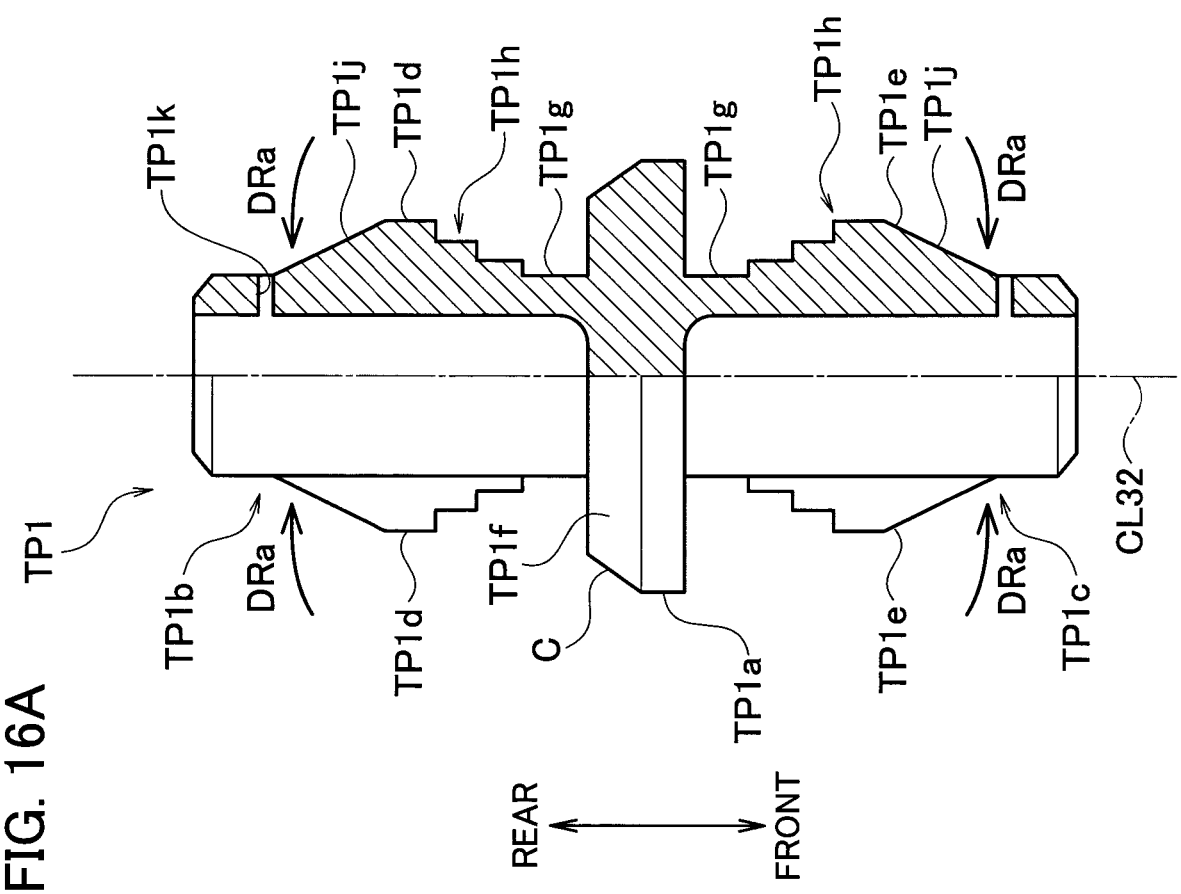
FIG. 16A is a half-sectional view of a mounting pin to be applied to the speaker mounting structure according to the third embodiment.

Next, one of the mounting pins TP1 will be described by mainly referring to FIGS. 16A and 16B. FIG. 16A is a half-sectional view of the mounting pin TP1, and FIG. 16B is a side view of the mounting pin TP1 viewed from the right side of FIG. 16A.

The mounting pin TP1 has an approximately cylindrical shape along a central axial line CL32 extending in the front-rear direction and is made of a resin. Examples of the resin include a polyamide synthetic resin, a polyimide resin, and an ABS resin, however not limited to these resins.

The mounting pin TP1 includes a guard portion TP1a projecting with respect to the central axial line CL32 at a middle part of the mounting pin TP1 in the front-rear direction, a first axial portion TP1b in an annular shape extending toward the rear side from the guard portion TP1a along the central axial line CL32, and a second axial portion TP1c in an annular shape extending toward the front side from the guard portion TP1a along the central axial line CL32. The guard portion TP1a has a rectangular shape viewed from the front side and formed to engage with the concave portion TB1 with less gap. A chamfering C is formed on an edge portion of the guard portion TP1a at a side of the first axial portion TP1b.

A pair of openings TP1k, TP1k is formed on the first axial portion TP1b at positions facing each other by an angle of 180° across the central axial line CL32. Within the openings TP1k, TP1k, a pair of flexible portions TP1d, TP1d is formed respectively to elastically bend inward in a diameter direction. A pair of flexible portions TP1e, TP1e is formed on the second axial portion TP1c in the same way.

The flexible portions TP1d, TP1d and the flexible portions TP1e, TP1e are connected to the guard portion TP1a and are elastically flexible around the guard portion TP1a in the direction of arrows DRa to approach the central axial line CL32. The flexible portions TP1d, TP1d and TP1e, TP1e are arranged symmetrical in the same shape.

The detailed shape of the flexible portions TP1d, TP1d and TP1e, TP1e will be described mainly with the flexible portion TP1*d* in the upper right of FIG. 16A as a representative by also referring to FIG. 16B.

The flexible portion TP1*d* includes a connecting portion TP1*g*, an engaging portion TP1*h*, and a guiding portion TP1*j*. The connecting portion TP1*g* is connected to a rear surface TP1*f* of the guard portion TP1*a*. The engaging portion TP1*h* is connected to an end of the connecting portion TP1*g* on the rear side and has a plurality of step portions formed in stairs in a direction separating from the central axial line CL32 toward the rear side (end). The guiding portion TP1*j* is formed to include an inclined surface smoothly inclined from an end of the engaging portion TP1*h* on the rear side in a direction approaching the central axial line CL32 toward the rear side (tip).

An outer diameter of the first axial portion TP1*b* is smaller than an inside diameter of the penetration hole TB3 of the mounting portion TB. Moreover, the inside diameter of the penetration hole TB3 has a value within a range between a maximum diameter and a minimum diameter of the engaging portions TP1*h*, TP1*h* in a natural state of the flexible portions TP1*d*, TP1*d*. As the pair of the engaging portions TP1*h*, TP1*h* bends inward, an edge portion of the penetration hole TB3 is engaged with any one of the plurality of step portions in each of the engaging portions TP1*h*, TP1*h*

In the following description, reference signs of the connecting portion TP1*g*, the engaging portion TP1*h*, and the guiding portion TP1*j* are commonly used in the flexible portions TP1*d*, TP1*d* and the flexible portions TP1*e*, TP1*e* unless otherwise is described specifically.

As shown in FIG. 16A, the pair of engaging portions TP1*h*, TP1*h*, in a natural state protrudes outward in the diameter direction from an external cylindrical shape of the first axial portion TP1*b* and an external cylindrical shape of the second axial portion TP1*c*.

Figure 18:
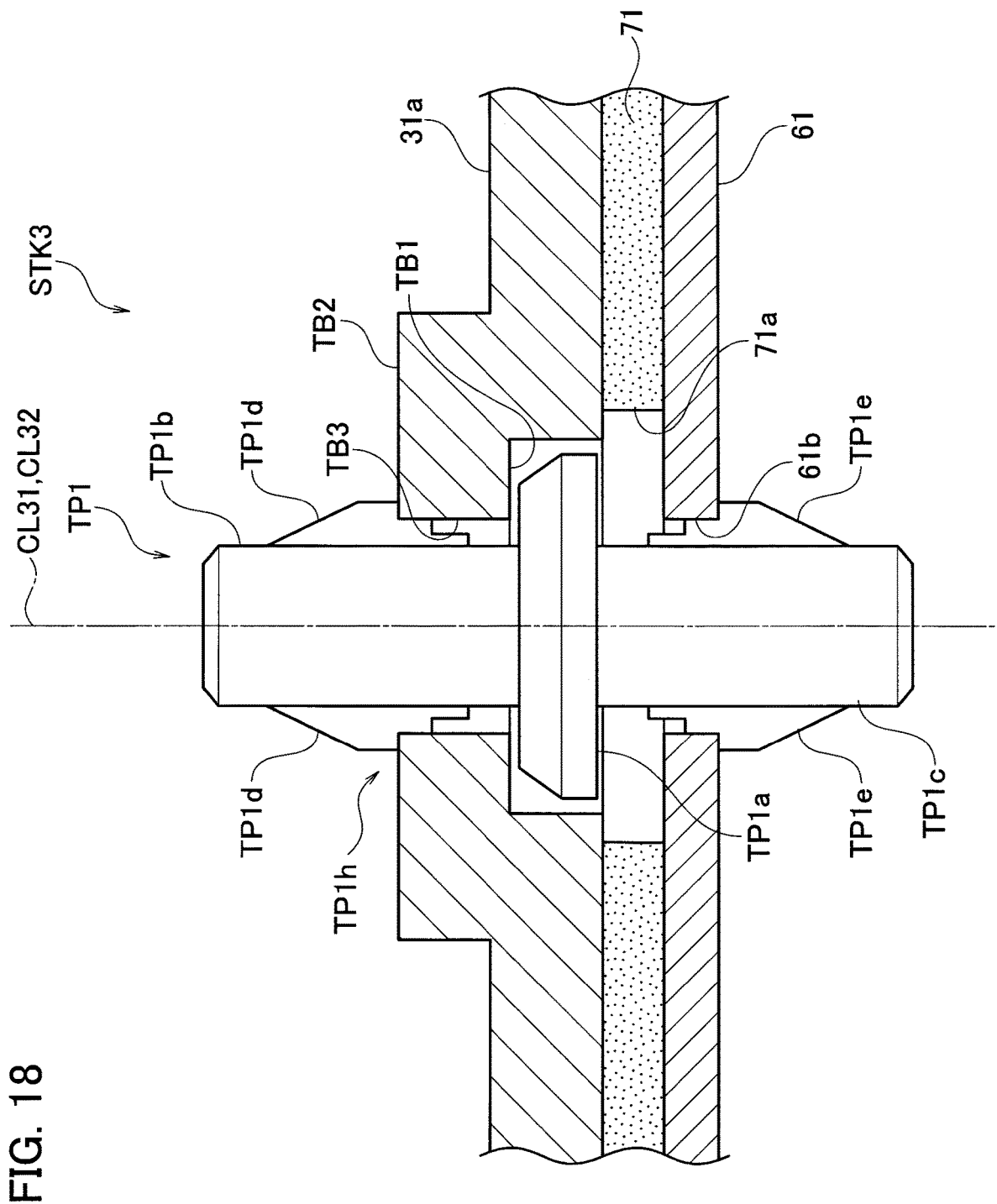
FIG. 18 is a cross-sectional view (partial cross-sectional view) for illustrating the speaker mounted on the vehicle frame in the speaker mounting structure according to the third exemplary embodiment.

Next, steps of mounting the speaker 53 on the vehicle frame 61 using the above-described mounting pins TP1 will be described with reference to FIGS. 17 and 18.

The first axial portion TP1*b* of each of the mounting pins TP1 is inserted into the corresponding penetration hole TB3 of the mounting portion TB of the speaker 53 such that the guard portion TP1*a* goes into the concave portion TB1 (arrow DRb) to engage an edge portion of the penetration hole TB3 on the rear side with the engaging portion TP1*h*. The insertion of the first axial portion TP1*b* into the penetration hole TB3 is easy because the guiding portions TP1*j*, TP1*j* are formed on the flexible portions TP1*d*, TP1*d*. The mounting pin TP1 is engaged with the protruding portion TB2 by sandwiching the protruding portion TB2 between the guard portion TP1*a* and the engaging portions TP1*h*, TP1*h* (see FIG. 18). The mounting pin TP1 thus does not fall off the flange portion 31*a*, and the second axial portion TP1*c* of the mounting pin TP1 protrudes to the front side while the mounting pin TP1 is mounted on the flange portion 31*a*.

Then, the speaker 53 is brought closer to the vehicle frame 61 with the front side of the flange portion 31*a* facing the vehicle frame 61, and the second axial portion TP1*c* of each of the mounting pins TP1 mounted on the flange portion 31*a* is inserted into the corresponding mounting hole 61*b* of the vehicle frame 61 (FIG. 17: arrow DRc).

Here, the outer diameter of the second axial portion TP1*c* is smaller than the inside diameter of the mounting hole 61*b* of the vehicle frame 61. Moreover, the inside diameter of the mounting hole 61*b* has a value within a range between the maximum diameter and the minimum diameter of the engaging portion TP1*h*, TP1*h* in a natural state of the flexible portion TP1*e*, TP1*e*. As the pair of engaging portions TP1*h*, TP1*h* bend inwardly, the edge portion of the mounting hole 61*b* is engaged with any one of the plurality of step portions of each of the engaging portions TP1*h*, TP1*h*. The insertion of the second axial portion TP1*c* into the mounting hole 61*b* is easy because the guiding portions TP1*j*, TP1*j* are formed on the flexible portions TP1*e*, TP1*e*.

In this way, each of the mounting pins TP1 has the first axial portion TP1*b* engaged with the flange portion 31*a* and the second axial portion TP1*c* engaged with the vehicle frame 61 to unify the speaker 53 having the flange portion 31*a* and the vehicle frame 61. The vehicle frame 61 unified with the speaker 53 is arranged on the front side of the flange portion 31*a*. According to the above-described speaker mounting structure STK3 of the third exemplary embodiment (FIG. 18), the speaker 53 is mounted on the vehicle frame 61, which is the mounted member, without using screws.

When the speaker 53 is removed from the vehicle frame 61, the pair of flexible portions TP1*d*, TP1*d* or the pair of flexible portions TP1*e*, TP1*e* are narrowed by pinching from both sides to be unengaged. This separates the mounting pin TP1 from the speaker 53 or the vehicle frame 61.

When the second axial portion TP1*c* is inserted into the mounting hole 61*b*, it is preferable to push the speaker 53 toward the vehicle frame 61 to the extent that the packing 71 is pressed. This generates elastic repulsion in the packing 71, and the elastic repulsion works on the flexible portions TP1*d*, TP1*d* of the first axial portion TP1*b* and the flexible portions TP1*e*, TP1*e* of the second axial portion TP1*c* in respective directions separating each other in the axial line direction. The mounting pin TP1 is thus mounted without slipping out of place, which is preferable.

Figure 19A:
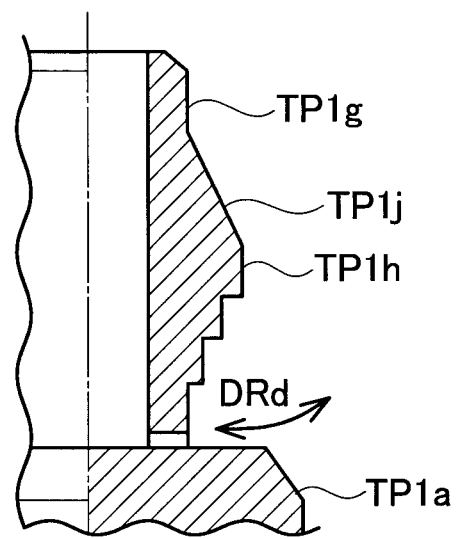
FIG. 19A is a diagram illustrating a modification of the mounting pin according to the third exemplary embodiment.
Figure 19B:
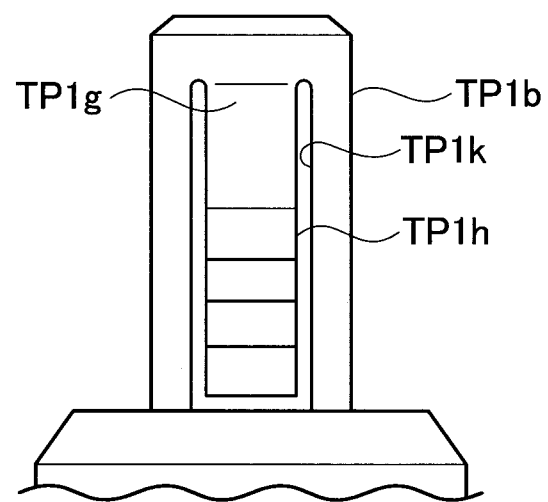
FIG. 19B is a diagram illustrating the modification of the mounting pin according to the third exemplary embodiment.

In the above-described example, the engaging portions TP1*h*, TP1*h* are connected to the guard portion TP1*a*. As shown in FIGS. 19A and 19B, each engaging portion TP1*h* may not be connected to the guard portion TP1*a* and connected to an end portion of the first axial portion TP1*b* or an end portion of the second axial portion TP1*c*.

The flexible portions TP1*d*, TP1*d*, and the flexible portions TP1*e*, TP1*e* are elastically bendable in respective directions approaching the central axial line CL32 and have the plurality of step portions formed in stairs in a direction separating from the central axial line CL32 toward the end. This enables the flexible portions TP1*d*, TP1*d*, and the flexible portions TP1*e*, TP1*e* to be engaged with mounted members having different thicknesses.

Fourth Embodiment

As a fourth exemplary embodiment, a speaker mounting structure STK4 in which a speaker 54 is to be mounted on a mounted member using mounting pins TP2 and no screws will be described. The speaker 54 is, for example, a speaker for a vehicle such as a car, and the mounted member is the vehicle frame 61. The vehicle frame 61 is, for example, a frame of a vehicle door which is made of sheet metal, and is the same as that described in the third exemplary embodiment.

The speaker 54 has mounting portions TBA in place of the mounting portions TB of the flange portion 31*a* in the speaker 53 described in the third exemplary embodiment. Portions other than the above are the same as those of the speaker 53.

Figure 20:
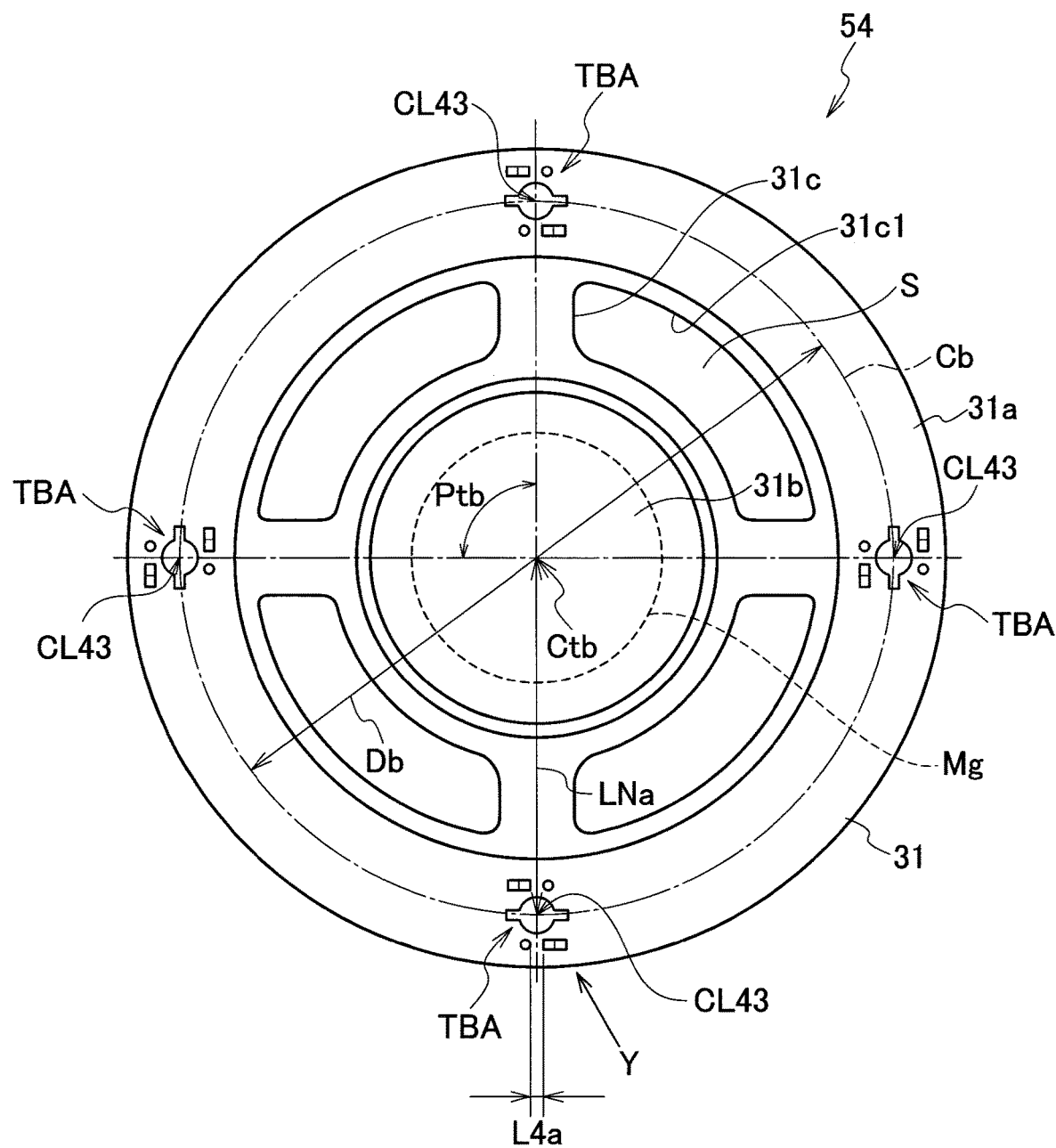
FIG. 20 is a rear view of a speaker to be applied to a speaker mounting structure according to a fourth exemplary embodiment.
Figure 21:
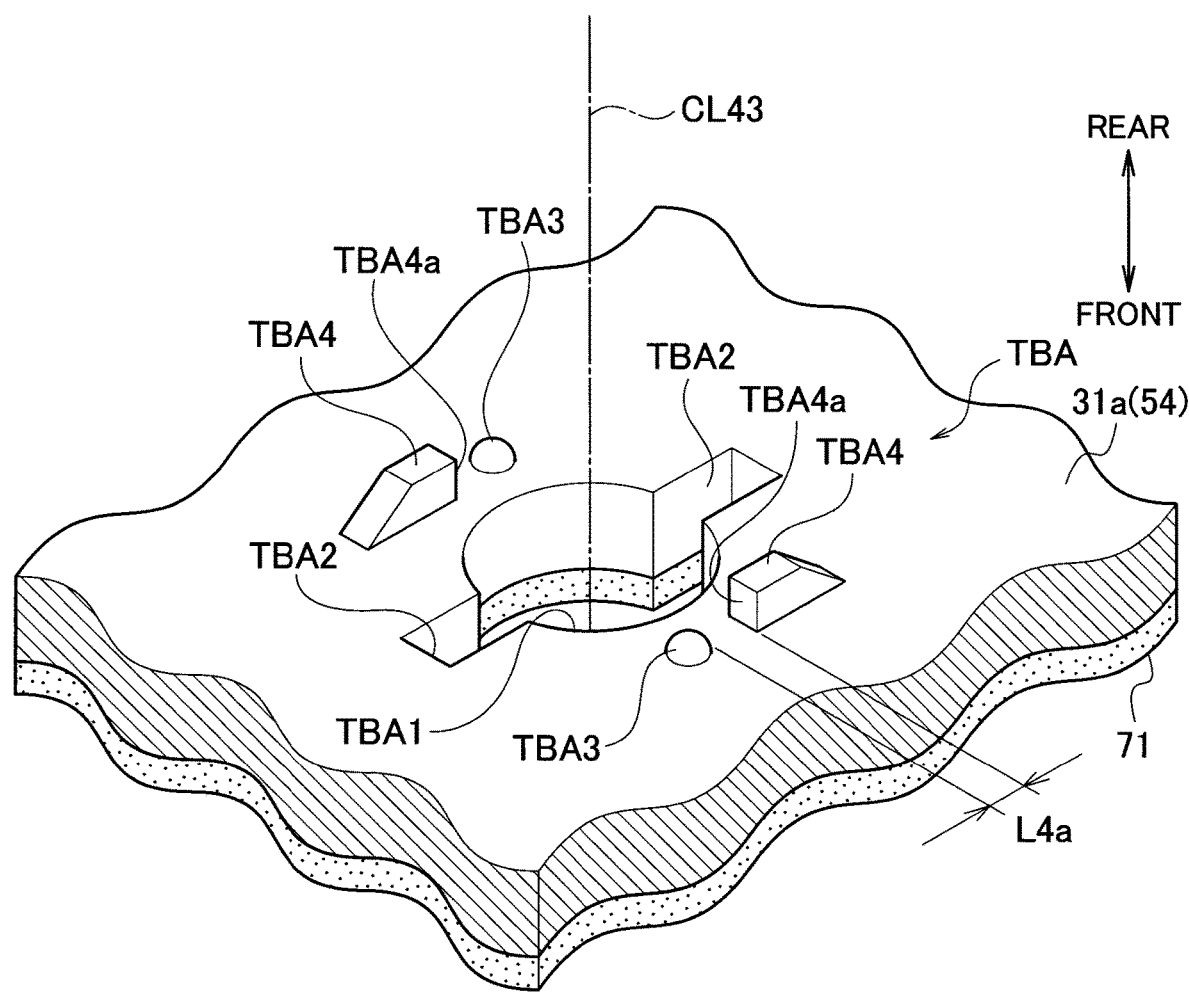
FIG. 21 is a partial enlarged cross-sectional view along an arrow Y in FIG. 20.

One of the mounting portions TBA of the speaker 54 will be described with reference to FIGS. 20 and 21. FIG. 20 is a rear view of the speaker 54, corresponding to FIG. 14. FIG. 21 is a view of the mounting portion TBA along an arrow Y in FIG. 20. The arrow Y represents a partial perspective view of the mounting portion TBA shown in FIG. 20 from diagonally above at the right bottom of the paper.

The mounting portions TBA are provided on the flange portion 31a at an angle pitch Ptb. In this example, the angle pitch Ptb is set to 90° which is equal to the angle pitch Pta. The position of a central axial line CL43 of each of the mounting portions TBA (see FIG. 20) extending in the front-rear direction is on the circumference Cb around the center position Ctb of the speaker 54 with the diameter Db.

The mounting portion TBA includes a penetration hole TBA1 formed along the central axial line CL43, a pair of protruding portions TBA3, TBA3 separated across the central axial line CL43 in a circumferential direction at an angle of 180° to face each other in the vicinity of the penetration hole TBA1, and a pair of stoppers TBA4, TBA4 formed to protrude and to be separated at a prescribed angle in the circumferential direction from the pair of protruding portions TBA3, TBA3, respectively, on the flange portion 31a.

A pair of expanding holes TBA2, TBA2 extending in an orthogonal direction to a diameter direction of the flange portion 31a is formed to be communicated with the penetration hole TBA1. Each of the protruding portions TBA3, TBA3 is formed to protrude in the rear direction as a part of a sphere. Each of the stoppers TBA4, TBA4 includes a contact surface TBA4a orthogonal to the surface of the flange portion 31a and is formed to protrude in the rear direction to be higher than the protruding portion TBA3.

As shown in FIG. 20, a distance between the protruding portion TBA3 and the stopper TBA4 in a direction orthogonal to a line LNa, which is a radius connecting the center position Ctb and the central axial line CL43, is set as a distance L4a.

Figure 22:
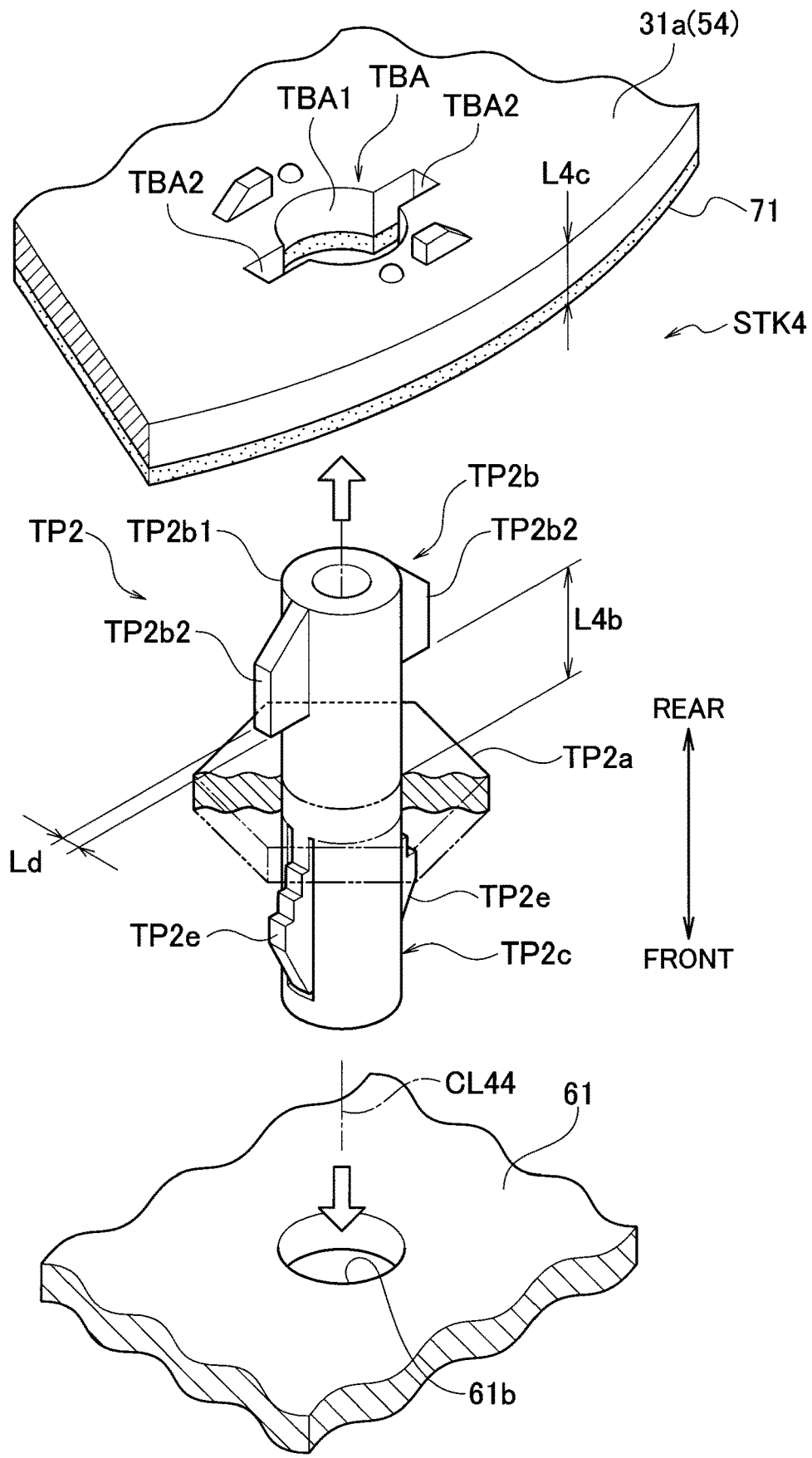
FIG. 22 is an assembly diagram for illustrating a speaker mounting structure and a mounting pin to be applied to the speaker mounting structure according to the fourth exemplary embodiment.

Next, one of the mounting pins TP2 will be described with reference to FIG. 22. FIG. 22 is an assembly diagram for describing the speaker mounting structure STK4 and steps of mounting the speaker 54 on the vehicle frame 61 using the mounting pins TP2.

The mounting pin TP2 has an approximately cylindrical shape along a central axial line CL44 in FIG. 22, which extends in the front-rear direction, and is made of a resin. Examples of the resin include a polyamide synthetic resin, a polyimide resin, and an ABS resin, however not limited to these resins.

The mounting pin TP2 includes a guard portion TP2a projecting in a direction orthogonal to the central axial line CL44 at a middle part of the mounting pin TP2 in the front-rear direction, a first axial portion TP2b extending in the rear direction from the guard portion TP2a, and a second axial portion TP2c in an annular shape extending in the front direction from the guard portion TP2a. The guard portion TP2a is formed in an equilateral hexagon. The second axial portion TP2c has the same structure as the second axial portion TP1c of the mounting pin TP1 and includes a pair of flexible portions TP2e, TP2e, which elastically bends to approach the central axial line CL44.

The first axial portion TP2b includes a base portion TP2b1 in a cylindrical shape, and a pair of claw portions TP2b2, TP2b2 formed to protrude outward at positions facing each other across the central axial line CL44 on the base portion TP2b1. The pair of claw portions TP2b2, TP2b2 functions as an engaging portion TP2h to engage with the vehicle frame 61. A distance L4b between each of the claw portions TP2b2 and the guard portion TP2a is set to be a little smaller than a thickness L4c, which is the sum of a thickness of the packing 71 and that of the flange portion 31a.

An outer diameter of the base portion TP2b1 is set to be inserted into the penetration hole TBA1 of the mounting portion TBA. A width Ld and the volume of the protrusion of each of the claw portions TP2b2 are set to be inserted into each of the expanding holes TBA2.

Figure 23:
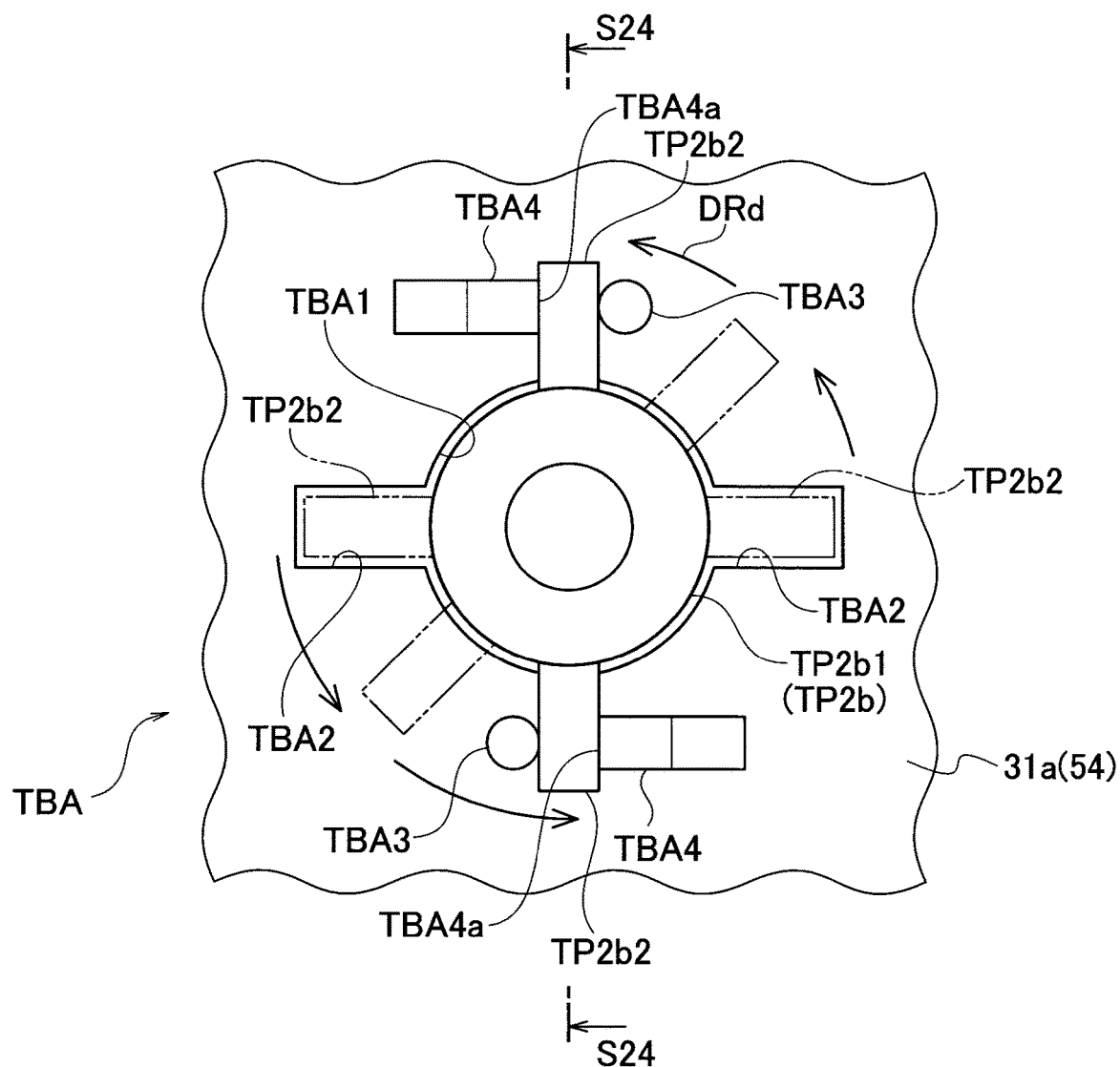
FIG. 23 is a diagram for illustrating steps of mounting the speaker in the speaker mounting structure according to the fourth exemplary embodiment.

Next, steps of mounting the speaker 54 on the vehicle frame 61 using the above-described mounting pins TP2 will be described with reference to FIGS. 22 and 23. FIG. 23 is a top view of one of the mounting portions TBA and the surrounding vicinity thereof to illustrate a part of mounting process of one of the mounting pins TP2.

First, the first axial portion TP2b of the mounting pin TP2 is mounted on the mounting portion TBA. Specifically, the claw portions TP2b2, TP2b2 of the first axial portion TP2b and the expanding holes TBA2, TBA2 are aligned, and the first axial portion TP2b is inserted into the penetration hole TBA1 from a side of the packing 71 of the flange portion 31a. In FIG. 23, a two-dot chain line shows a rear view of the claw portions TP2b2 passing through the penetration hole TBA1.

Next, the mounting pin TP2 is rotated in a counterclockwise direction viewed from the rear side until the claw portions TP2b2, Tp2b2 come in contact with the stoppers TBA4, TBA4 across the protruding portions TBA3, TBA3, respectively (see arrows DRd in FIG. 23). This enables the mounting pin TP2 to be mounted on the flange portion 31a, that is, the mounting pin TP2 is mounted to the speaker 54. A state in which the mounting pin TP2 is mounted on the speaker 54 will be called a mounted state below.

In order to enable the claw portions TP2b2, TP2b2 to get over the protruding portions TBA3, TBA3, respectively, the mounting pin TP2 is pressed to the rear side and rotated while the packing 71 is compressed. This moves the mounting pin TP2 to the rear side and enables the claw portions TP2b2, TP2b2 to get over the protruding portions TBA3, TBA3, respectively.

When the mounting pin TP2 is rotated, the second axial portion TP2c may be held between one's fingers and rotated, or the guard portion TP2a may be rotated using a box wrench having a hexagon shape. Rotating the mounting pin TP2, which is in the mounted state, in the clockwise direction of FIG. 23 enables the mounting pin TP2 to be removed from the speaker 54.

The previously-described distance L4a shown in FIG. 21 is set to be approximately same as the width Ld of each of the claw portions TP2b2, TP2b2. When each of the claw portion TP2b2 is in contact with each of the stoppers TBA4, TBA4, the mounting pin TP2 is thus positioned having almost no shift around the central axial line CL44.

After the mounting pin TP2 is mounted on the speaker 54, the second axial portion TP2c is mounted on the vehicle frame 61. The structure and steps in this mounting are the same as those in mounting of the mounting pin TP1 on the vehicle frame 61.

Figure 24:
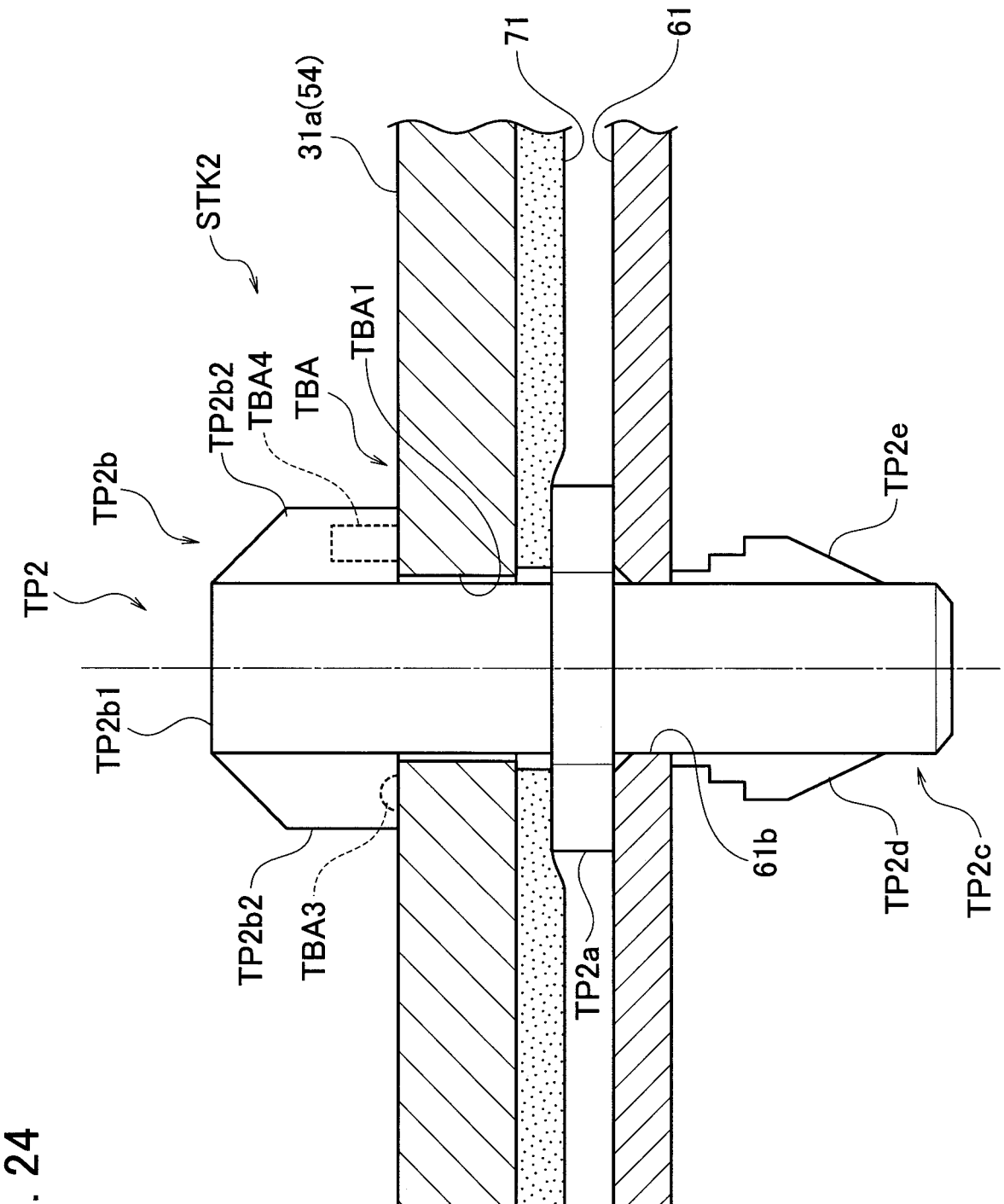
FIG. 24 is a cross-sectional view for illustrating the speaker mounting structure according to the fourth exemplary embodiment.

FIG. 24 is a cross-sectional view of the mounting portion TBA and the surrounding vicinity thereof in a state in which the second axial portion TP2c of the mounting pin TP2 in the mounted state is mounted on the vehicle frame 61, that is, the speaker 54 is mounted on the vehicle frame 61 using the mounting pins TP2. This corresponds to a cross-section taken along a line S24-S24 in FIG. 23.

Fifth Embodiment

As a fifth exemplary embodiment, a speaker mounting structure STK4 in which a speaker 55 is to be mounted on the mounted member using mounting pins TP3 and no screws will be described. The speaker 55 is, for example, a speaker for a vehicle such as a car, and the mounted member is the vehicle frame 61. The vehicle frame 61 is, for example, a frame of a vehicle door which is made of sheet metal, and is the same as that described in the first exemplary embodiment.

The speaker 55 has mounting portions TBB in place of the mounting portions TB of the flange portion 31a in the speaker 53 described in the third exemplary embodiment and has the packing 71 removed. Portions other than the above are the same as those of the speaker 53.

Figure 25:
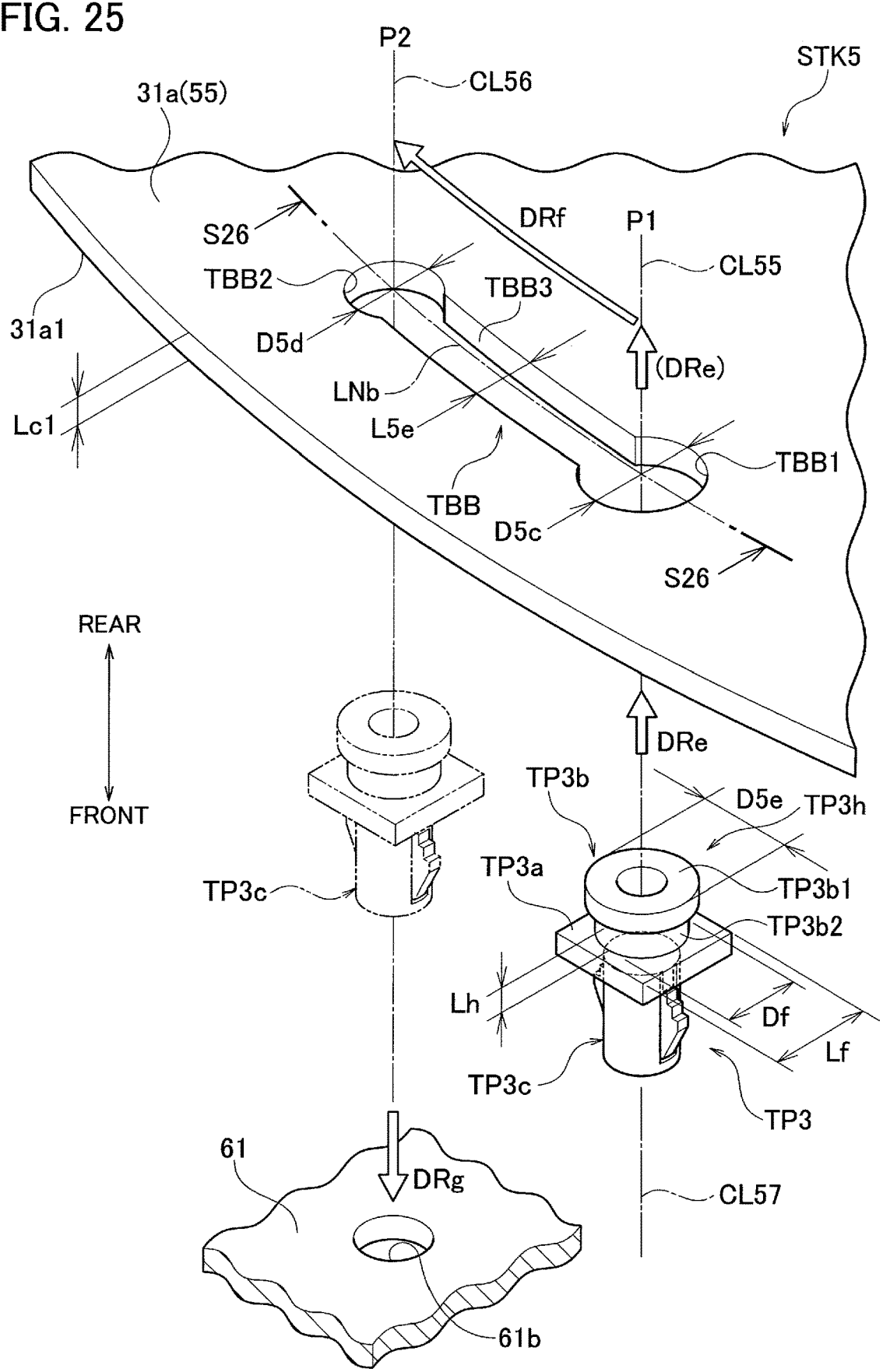
FIG. 25 is an assembly diagram for illustrating a speaker mounting structure and a mounting pin to be applied to the speaker mounting structure according to a fifth exemplary embodiment.

One of the mounting portions TBB of the speaker 53 will be described with reference to FIG. 25. FIG. 25 is an assembly diagram for describing mounting of the mounting pin TP3 on the mounting portion TBB on the flange portion 31a of the speaker 55.

The mounting portion TBB includes a large-diameter hole TBB1, a small-diameter hole TBB2 and a connecting hole TBB3. The large-diameter hole TBB1 is a penetration hole formed along a central axial line CL55 at a position P1 arbitrarily set on the flange portion 31a and extending in the front-rear direction. The small-diameter hole TBB2 is a penetration hole formed along a central axial line CL56, which passes a position P2 separated from the position P1 in a circumferential direction and extends in the front-rear direction. The connecting hole TBB3 is a penetration hole having a width L5e in a diameter direction and formed along a circular arc LNb, which passes the center of the large-diameter hole TBB1 and the center of the small-diameter hole TBB2 and has the center position Ctb (FIG. 14) as the center, to communicate the large-diameter hole TBB1 with the small-diameter hole TBB2.

An inside diameter D5c of the large-diameter hole TBB1 is set to be sufficiently larger than an inside diameter D5d of the small-diameter hole TBB2. The inside diameter D5d of the small-diameter hole TBB2 is set to be slightly larger than the width L5e of the connecting hole TBB3.

Next, one of the mounting pins TP3 will be described with reference to FIG. 25. FIG. 25 is an assembly diagram for describing the speaker mounting structure STK5 and steps of mounting the speaker 55 on the vehicle frame 61 using the mounting pins TP3.

Each of the mounting pins TP3 has an approximately cylindrical shape along a central axial line CL57 extending in the front-rear direction in FIG. 25 and is made of a resin. Examples of the resin include a polyamide synthetic resin, a polyimide resin, and an ABS resin, however not limited to these resins.

Each of the mounting pins TP3 includes a guard portion TP3a projecting in a direction orthogonal to the central axial line CL57 at a middle part of the mounting pin TP3 in the front-rear direction, a first axial portion TP3b extending in the rear direction from the guard portion TP3a, and a second axial portion TP3c in an annular shape extending in the front direction from the guard portion TP3a. The guard portion TP3a is formed in a regular square with a width Lf as a length (width) of one side, for example. The second axial portion TP3c has the same structure as that of the second axial portion TP2c of the mounting pin TP2 and includes a pair of flexible portions TP3e, TP3e which elastically bends to approach the central axial line CL57.

The first axial portion TP3b includes a base portion TP3b2 in a cylindrical shape, and a flange TP3b1 having an enlarged diameter at the end of the base portion TP3b2 on the rear side. The flange TP3b1 functions as an engaging portion TP3h to engage with the vehicle frame 61. A distance Lh between the flange TP3b1 and the guard portion TP3a in the front-rear direction is set to be equal to or slightly larger than a thickness Lc1 of the flange portion 1a.

An outer diameter D5e of the flange TP3b1 is set to be smaller than the inside diameter D5c of the large-diameter hole TBB1 and larger than the inside diameter D5d of the small-diameter hole TBB2 of the mounting portion TBB. An outer diameter Df of the base portion TP3b2 is set to be approximately same as the inside diameter D5d of the small-diameter hole TBB2 and slightly larger than the width L5e of the connecting hole TBB3. In detail, the outer diameter Df is formed large enough such that the base portion TP3b2 passes through the connecting hole TBB3 while the base portion TP3b2 is elastically deformed.

Next, steps of mounting the speaker 55 on the vehicle frame 61 using the mounting pins TP3 will be described with reference to FIG. 25.

First, the flange TP3b1 of the first axial portion TP3b of the mounting pin TP3 is passed through the large-diameter hole TBB1 from the front side to the rear side (arrow DRe), and the guard portion TP3a is made to come in contact with a surface of the flange portion 31a on the front side.

Next, the mounting pin TP3 is moved along the connecting portion TBB3 (arrow DRf) to be positioned at the position P2. In this movement, the base portion TP3b2 slides in contact with the connecting hole TBB3. This enables the mounting pin TP3 to be mounted at the position P2 of the flange portion 31a.

Then, the second axial portion TP3c of the mounting pin TP3, which protrudes to the front side (shown in FIG. 25 by a two-dot chain line), is engaged in the mounting hole 61b of the vehicle frame 61 by the flexible portions TP3e, TP3e (arrow DRg), in the same way as in the third and fourth exemplary embodiments.

Figure 26:
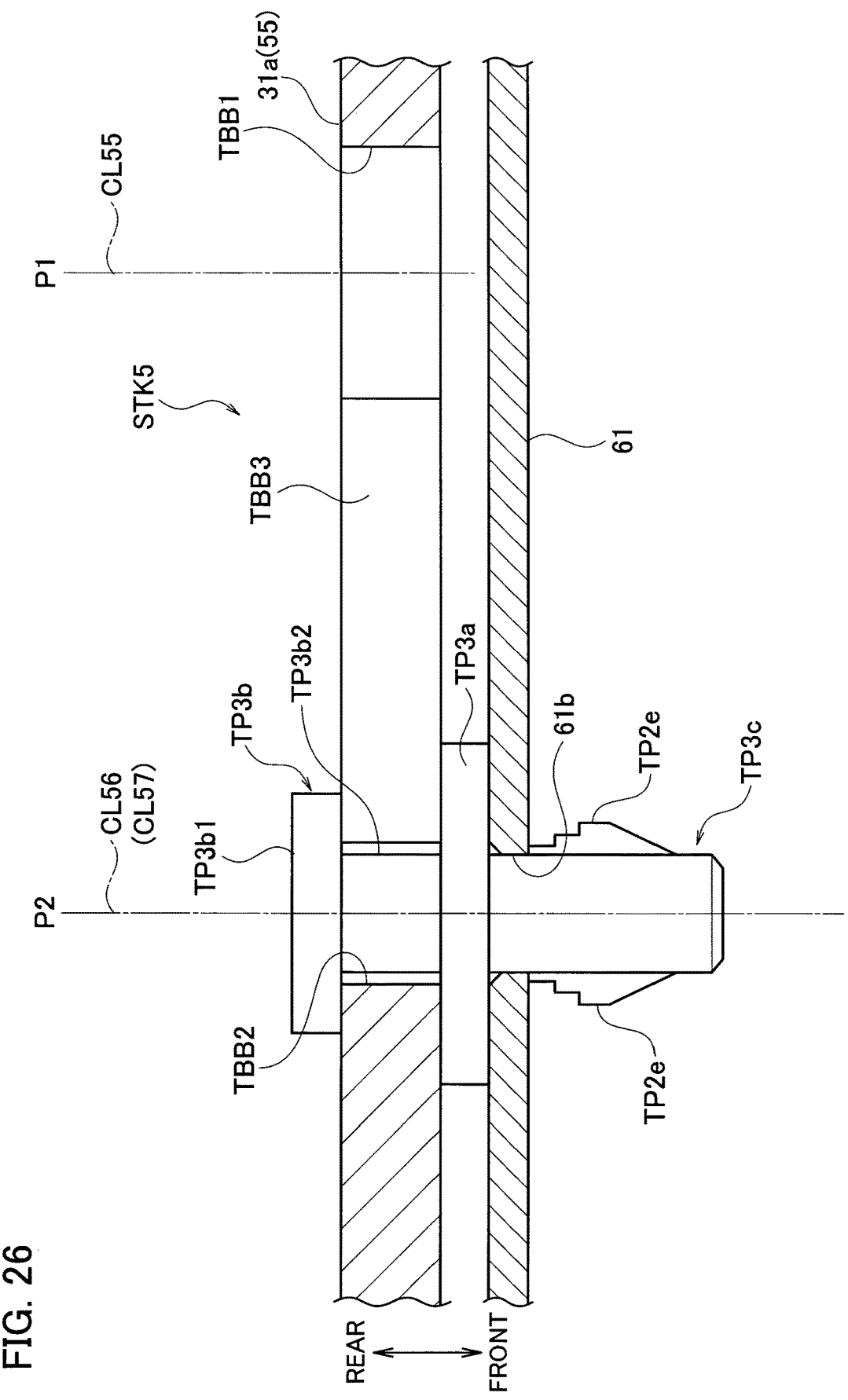
FIG. 26 is a cross-sectional view for illustrating the speaker mounting structure according to the fifth exemplary embodiment taken along a line S26-S26 in FIG. 25.

As shown in a cross-sectional view in FIG. 26 (taken along a line S26-S26 in FIG. 25), this enables the flange portion 31a (speaker 55) to be mounted on the vehicle frame 61 at the position TP2 by the mounting pin TP3.

The speaker 55 in the mounted state shown in FIG. 26 is rotated in a mounting direction of the mounting pin TP3 shown in the arrow DRf to relatively move the first axial portion TP3b of the mounting pin TP3 to the position P1. Then, the speaker 55 is moved in the rear direction (separated from the vehicle frame 61 to the rear side), and thus the speaker 55 is removed. It is possible to remount the speaker 55 on the mounting pins TP3 mounted on the vehicle frame 61 as necessary.

As described above, in the speaker mounting structures STK3 to STK5 according to the third to the fifth exemplary embodiments, the speakers 53, 54, and 55 are mounted on the mounted member using only mounting tools and no screws. The mounting is thus performed with less number of parts and less work. Moreover, this reduces the weight because usual metal screws are not used. Furthermore, as previously described, the frame 31 has at least the flange portion 31a including the mounting portions TB, TBA, and TBB made of a resin, and thus further reduction in weight is possible.

Sixth Embodiment

As the third exemplary embodiment, the speaker mounting structure STK3 has been described, in which the speaker 53 is mounted on the vehicle frame 61 which is the mounted member, by making the front side of the flange portion 31a contact with the vehicle frame 61. On the other hand, as a sixth exemplary embodiment, a speaker mounting structure STK6 will be described, in which a speaker 56 is to be mounted on the vehicle frame 61 which is the mounted member, by making the rear side of the flange portion 31a contact with the vehicle frame 61.

The speaker 56 applied in the sixth exemplary embodiment includes mounting portions TBC in place of the mounting portions TB and a packing 71C on the rear side of the flange portion 31a in place of the packing 71. Portions other than the mounting portions TBC and the packing 71C of the speaker 56 are the same as those of the speaker 53.

The mounted member will be described using the vehicle frame 61, which is the same as that of the third exemplary embodiment. In the sixth exemplary embodiment, the sound emitting hole 61a functions as a frame through hole 61a having an inside diameter larger than a root diameter of the frame 31 of the speaker 56. That is, a root portion of the frame 31 is inserted into the frame through hole 61a. In the sixth exemplary embodiment, a reference sign of 61a in FIG. 1 will be read as the frame through hole 61a.

Figure 27:
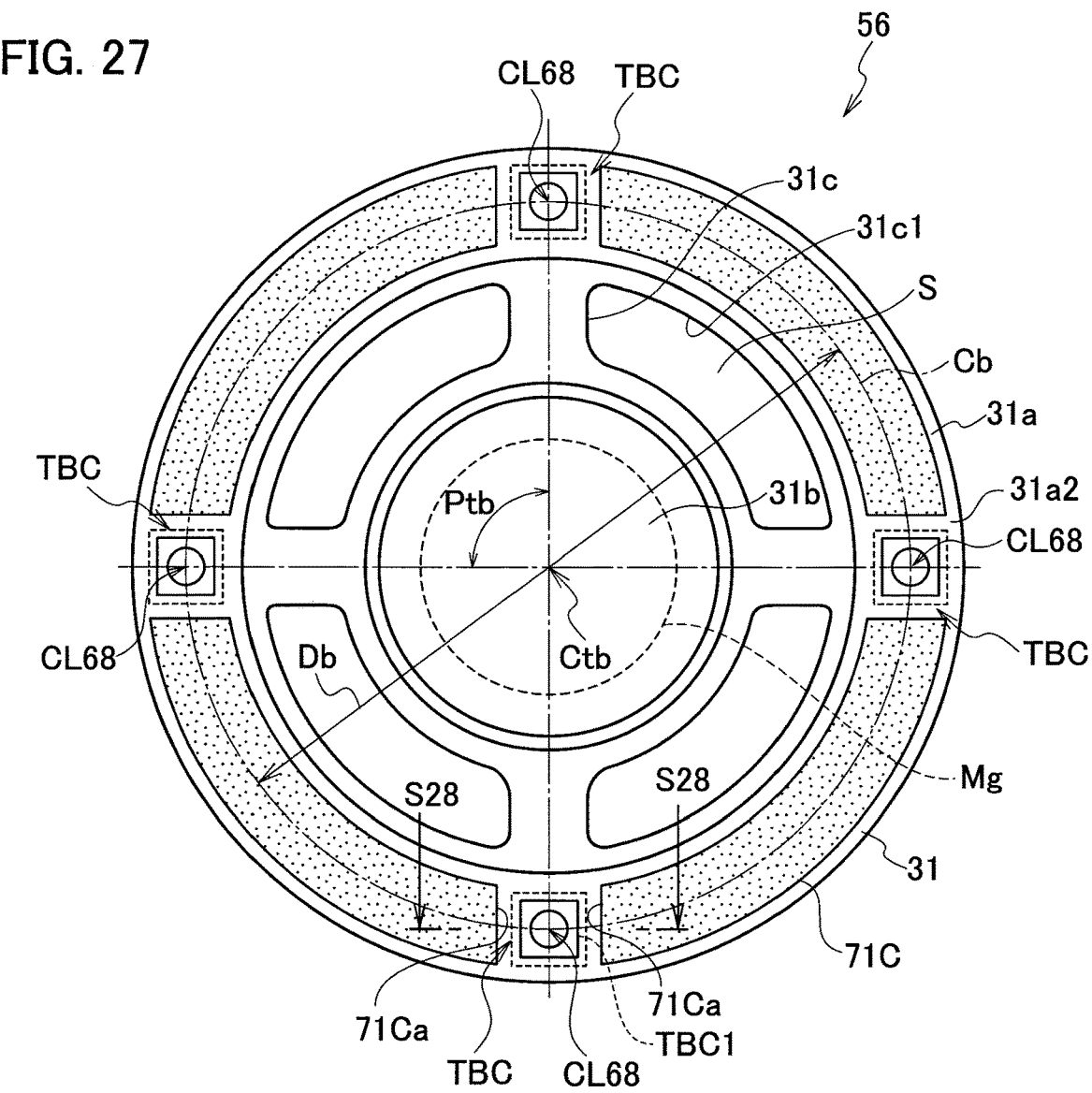
FIG. 27 is a rear view of a speaker to be applied to a speaker mounting structure according to a sixth exemplary embodiment.
Figure 28:
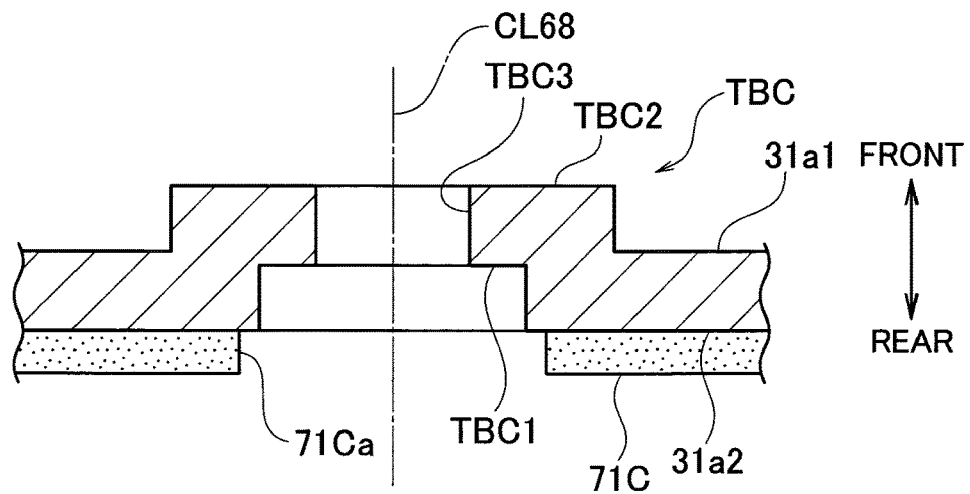
FIG. 28 is a cross-sectional view taken along a line S28-S28 in FIG. 27.

The mounting portions TBC of the speaker 56 will be described with reference to FIGS. 27 and 28. FIG. 27 is a rear view of the speaker 56, corresponding to FIG. 14. FIG. 28 is a cross-sectional view taken along a line S28-S28 in FIG. 28.

Each of the mounting portions TBC has the concave and the convex inversed in the front-rear direction with respect to the mounting portion TB. That is, the mounting portion TBC is configured to include a concave portion TBC1, which is concave in a rectangular shape from a surface 31a2 of the flange portion 31a on the rear side toward the front side, a protruding portion TBC2, which protrudes to the front side to correspond to the concave portion TBC1 to ensure the thickness, and a penetration hole TBC3, which is formed along a central axial line CL68 on the protruding portion TBC2.

On the surface 31a2 of the flange portion 31a on the rear side, each of packings 71C in the shape of an arc of a circle is mounted between concave portions TBC1, which are arranged to be apart in the circumferential direction and adjacent to each other. The penetration hole TBC3 is formed in a round shape viewed from the front side.

Figure 29:
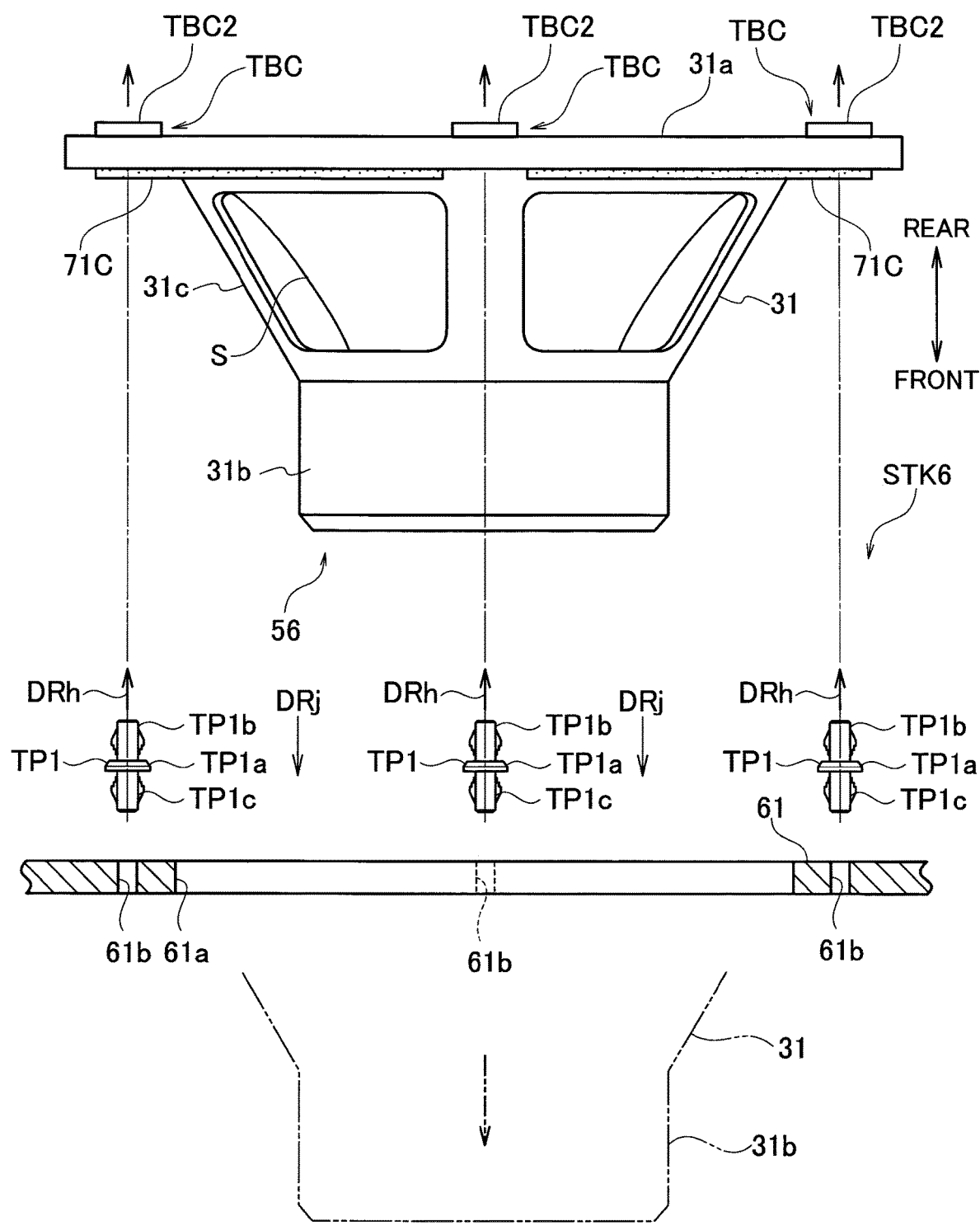
FIG. 29 is a diagram for illustrating mounting steps in the speaker mounting structure according to the sixth exemplary embodiment.
Figure 30:
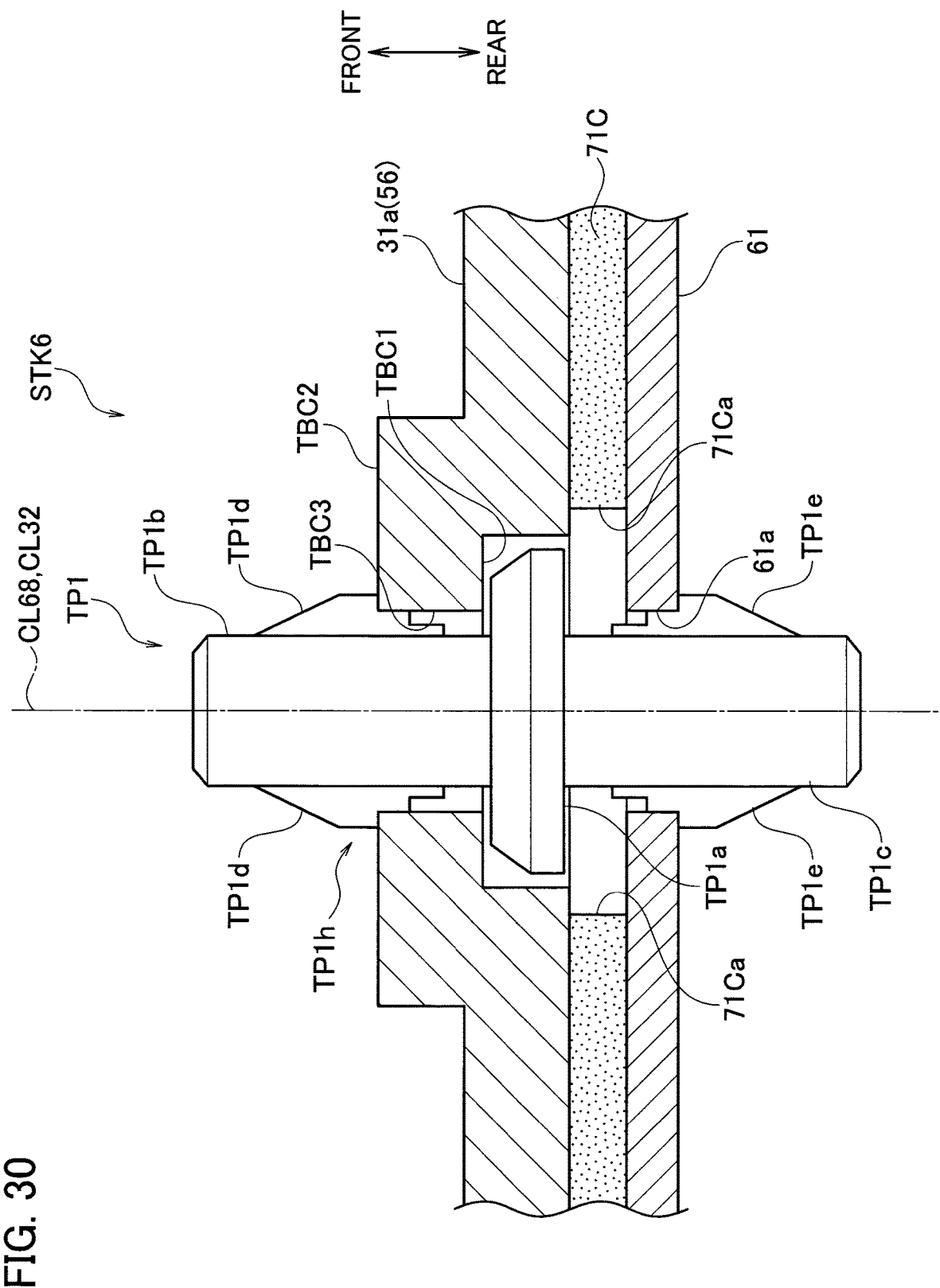
FIG. 30 is a cross-sectional view (partial cross-sectional view) for illustrating the speaker mounted on the vehicle frame in the speaker mounting structure according to the sixth exemplary embodiment.

The speaker 56 is mounted on the vehicle frame 61, which is the mounted member, in the speaker mounting structure STK6 shown in FIGS. 29 and 30 using the mounting pins TP1 described in the third exemplary embodiment.

FIG. 29 is a diagram for describing steps of mounting the speaker 56 in the speaker mounting structure STK6. FIG. 30 is a cross-sectional view (partial cross-sectional view) for illustrating the speaker mounting structure STK6. FIGS. 29 and 30 respectively correspond to FIGS. 17 and 18 referred to in the third exemplary embodiment.

First, the first axial portion TP1b of each of the mounting pins TP1 is inserted into the corresponding penetration hole TBC3 (arrows DRh) from the rear side of the mounting portion TBC of the speaker 56. This insertion makes the guard portion TP1a get into the concave portion TBC1 to engage an edge portion of the penetration hole TBC3 on the front side with the engaging portions TP1h, TP1h. The insertion of the first axial portion TP1b into the penetration hole TBC3 is easy because the guiding portions TP1j, TP1j are formed on the flexible portions TP1d, TP1d.

The mounting pin TP1 is engaged to the protruding portion TBC2 by sandwiching the protruding portion TBC2 between the guard portion TP1a and the engaging portions TP1h, TP1h (see FIG. 30). The mounting pin TP1 thus does not fall off the flange portion 31a, and the second axial portion TP1c of the mounting pin TP1 protrudes to the rear side while the mounting pin TP1 is mounted on the flange portion 31a.

Then, the speaker 56 is brought closer to the vehicle frame 61 with the rear side of the flange portion 31a facing the vehicle frame 61, and the cover 31b receiving the magnet Mg and the frame 31 are passed through the frame though hole 61a (shown by two-dot chain line in FIG. 29). Moreover, the second axial portion TP1c of each of the mounting pins TP1 mounted on the flange portion 31a, which protrudes to the rear side, is inserted into the corresponding mounting hole 61b to be engaged with the vehicle frame 61 (arrows DRj in FIG. 29). The mounting of the second axial portion TP1c in the mounting hole 61b is performed in the same way as in the third exemplary embodiment. This brings the mounting pin TP1 in a mounted state shown in FIG. 30.

As shown in FIG. 30, each of the mounting pin TP1 has the first axial portion TP1b engaged with the flange portion 31a and the second axial portion TP1c engaged with the vehicle frame 61 to unify the speaker 56 having the flange portion 31a and the vehicle frame 61. In the sixth exemplary embodiment, the vehicle frame 61 unified with the speaker 56 is arranged on the rear side of the flange portion 31a.

That is, according to the speaker mounting structure STK6 of the above-described sixth exemplary embodiment, the speaker 56 is mounted on the vehicle frame 61, which is the mounted member, without using screws.

When the speaker 56 is removed (separated) from the vehicle frame 61, the flexible portions TP1d, TP1d or the flexible portions TP1e, TP1e are narrowed by pinching from both sides to be unengaged. This separates the mounting pin TP1 from the speaker 53 or the vehicle frame 61.

When the second axial portion TP1c is inserted into the mounting hole 61b, it is preferable to push the speaker 56 toward the vehicle frame 61 to the extent that the packing 71C is pressed. This generates elastic repulsion in the packing 71C, and the elastic repulsion works on the flexible portions TP1d, TP1d of the first axial portion TP1b and the flexible portions TP1e, TP1e of the second axial portion TP1c in respective directions separating each other in the axial line direction. The mounting pin TP1 is thus mounted without slipping out of place, which is preferable.

Each of the exemplary embodiments of the present invention is not intended to be limited to the above-described configurations and may be made as modified examples varied within a scope not deviating from the gist of the present invention.

The base portion 3a of the locking member 3 is not limited to one formed in a column shape and may be formed in any shape. As long as the speaker 51 is to be mounted on the mounted member (vehicle frame 61) and separated from the mounted member (vehicle frame 61) after mounting, the hole 3f of the locking member 3 may be omitted. The speakers 51 and 52 may have a structure where (i) the frame 1 which includes the flange portion 1a, is made of a metal, and (ii) the mounting portion TTB and the surrounding vicinity thereof regarding the speaker 51, and the mounting portion TTB and the screw mounting portion TTB2 and the surrounding vicinity thereof regarding the speaker 52 are formed as resin parts and mounted on the flange portion 1a. The flange portion 1a is not limited to the circular annular shape and may be an elliptic annular shape, or an angular annular shape, for example.

Figure 13:
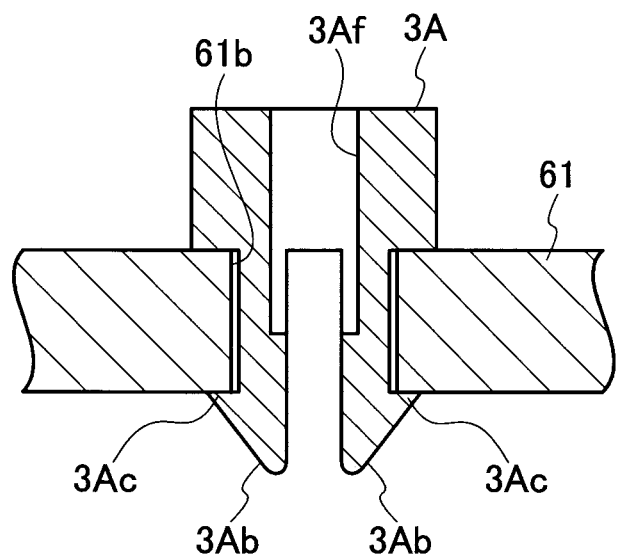
FIG. 13 is a cross-sectional view illustrating a modification of the locking member according to the first and the second exemplary embodiments.

The locking portions 3b, 3b of the locking member 3 are not limited to one formed with the circumferential ribs 3d. Corresponding to the thickness of the mounted member (vehicle frame 61), for example, as the locking member 3A shown in FIG. 13, the locking portions 3b, 3b may include locking portions 3Ab, 3Ab having a pair of locking claws 3Ac, 3Ac formed thereon to be caught on a surface of the mounted member on the front side.

The shape of the guard portion TP1a in the third exemplary embodiment and the sixth exemplary embodiment, and the shape of the guard portion TP3a in the fifth exemplary embodiment are not limited to a rectangular shape (regular square, rectangle) viewed from the top and are set freely to a rhombus, a triangle, or a circle, for example.

The first axial portion TP1b and the second axial portion TP1c in the third exemplary embodiment and the sixth exemplary embodiment are not limited to ones having the same central axial line CL32 as the axis and may have different parallel axial lines, respectively. In the same way, the first axial portion TP3b and the second axial portion TP3c in the fifth exemplary embodiment are not limited to ones having the same central axial line CL57 as the axis and may have different parallel axial lines, respectively. The mounting pins TP1 to TP3 are not limited to ones formed in an approximately cylindrical shape and may be freely formed in a tubular shape, such as an angular tubular shape.

The speakers 53 to 56 may have a structure where a main part of the frame 31, which includes the flange portion 31a, is formed of a metal, and the mounting portions TB, TBA, TBB and TBC and respective surrounding vicinities thereof are formed as resin parts to be mounted on the flange portion 31a. The flange portion 31a may not be in a circular annular shape and may be in an elliptic collar shape, or an angular collar shape, for example.

The speaker mounting structures STK4 and SKT5 described in the fourth exemplary embodiment and the fifth exemplary embodiment may have a speaker mounting structure where a speaker is mounted by contacting the rear surface of the flange portion 31a with the vehicle frame 61, which is the mounted member, in the same way as in the speaker mounting structure STK6 described in the sixth exemplary embodiment.

According to the present invention, a speaker is mounted on a mounted member with less number of parts and less work. Moreover, the mounting on the mounted member is performed with less number of parts and less work, thereby reducing the weight.

It is noted that the present invention is utilized for a speaker for a vehicle, which is to be mounted on a mounted member in a plate shape such as a vehicle frame, and the mounting structure thereof.

What is claimed is:

1. A speaker comprising:
a flange portion including a penetration hole;
a locking member arranged in the penetration hole and including a locking portion that protrudes from the flange portion at a first surface side of the flange portion and is configured to be locked in a mounting hole in a prescribed size; and
a connecting portion connecting an end surface that faces the penetration hole with the locking member, wherein the connecting portion has a thickness less than a thickness of the flange portion at a second surface side of the flange portion, the second surface side being opposite the first surface side of the flange portion.

2. A speaker comprising:
a flange portion including a penetration hole;
a locking member including a base portion that is arranged in the penetration hole and has a first hole extending in the same direction as the penetration hole, and a locking portion that is connected to the base portion, protrudes from the flange portion at a first surface side of the flange portion and is configured to be locked in a mounting hole in a prescribed size;
a connecting portion connecting an end surface that faces the penetration hole with the base portion, wherein the connecting portion has a thickness less than a thickness of the flange portion at a second surface side of the flange portion, the second surface side being opposite the first surface side of the flange portion; and
a pocket portion including a bottom, the pocket portion formed on the flange portion and configured to receive therein the base portion separated by cutting the connecting portion,
wherein the pocket portion includes a second hole on the bottom, the second hole formed such that the first hole of the base portion received in the pocket portion is seen through the second hole.

3. A speaker mounting structure for mounting a speaker on a mounted member, wherein the speaker comprises:
a flange portion including a penetration hole;
a locking member arranged in the penetration hole and including a locking portion that protrudes from the flange portion at a first surface side of the flange portion and is configured to be locked in a mounting hole in a prescribed size; and
a connecting portion connecting an end surface that faces the penetration hole with the locking member, wherein the connecting portion has a thickness less than a thickness of the flange portion at a second surface side of the flange portion, the second surface side being opposite the first surface side of the flange portion,
the mounted member includes the mounting hole in the prescribed size, and
the speaker is mounted on the mounted member by locking the locking member of the speaker in the mounting hole of the mounted member.

4. A speaker mounting structure for mounting a speaker on a mounted member, wherein the speaker comprises:
a flange portion including a penetration hole;
a locking member including a base portion that is arranged in the penetration hole and has a first hole extending in the same direction as the penetration hole, and a locking portion that is connected to the base portion, protrudes from the flange portion at a first surface side of the flange portion and is configured to be locked in a mounting hole in a prescribed size;
a connecting portion connecting an end surface that faces the penetration hole with the base portion, wherein the connecting portion has a thickness less than a thickness of the flange portion at a second surface side of the flange portion, the second surface side being opposite the first surface side of the flange portion; and
a pocket portion including a bottom, the pocket portion formed on the flange portion and configured to receive therein the base portion separated by cutting the connecting portion,
wherein the pocket portion includes a second hole on the bottom, the second hole formed such that the first hole of the base portion received in the pocket portion is seen through the second hole,
the mounted member includes the mounting hole in the prescribed size, and
the speaker is mounted on the mounted member by locking the locking member of the speaker in the mounting hole of the mounted member.

5. The speaker mounting structure according to claim 3, wherein a portion other than the locking member of the speaker mounted on the mounted member is to be removed from the mounted member by cutting the connecting portion.

6. The speaker mounting structure according to claim 4, wherein a portion other than the locking member of the speaker mounted on the mounted member is to be removed from the mounted member by cutting the connecting portion.

7. The speaker mounting structure according to claim 4, wherein a locking member-less speaker that is a portion other than the locking member of the speaker mounted on the mounted member with the locking member locked in the mounting hole is to be removed from the mounted member by cutting the connecting portion, and the locking member-less speaker removed from the mounted member is to be mounted on the mounted member by receiving in the pocket portion the base portion of the locking member locked in the mounting hole and screwing a screw into the first hole of the base portion through the second hole of the bottom.

\* \* \* \* \*